US005966066A

United States Patent [19]
Mehregany et al.

[11] Patent Number: 5,966,066
[45] Date of Patent: Oct. 12, 1999

[54] MICROMECHANICAL MEMORY SENSOR

[75] Inventors: Mehran Mehregany, Pepper Pike; Kenneth G. Goldman, Middleburg Heights, both of Ohio; Vijayakumar R. Dhuler, Cary, N.C.

[73] Assignee: Case Western Reserve University, Cleveland, Ohio

[21] Appl. No.: 08/868,705

[22] Filed: Jun. 4, 1997

Related U.S. Application Data

[63] Continuation of application No. 08/258,427, Jun. 10, 1994, Pat. No. 5,712,609.

[51] Int. Cl.$^6$ ............ H01H 71/22; H01H 29/84; H01H 37/10; H01L 23/58
[52] U.S. Cl. ............ 337/70; 257/415; 257/798; 337/14
[58] Field of Search ............ 337/2, 3, 13, 36, 337/40, 41–50, 70–78, 85, 123–129, 140, 298, 333–340, 356–359; 307/112, 116; 257/414–420, 798

[56] References Cited

U.S. PATENT DOCUMENTS

| | | | |
|---|---|---|---|
| 3,294,927 | 12/1966 | Hill | 200/5 R |
| 3,593,249 | 7/1971 | Sedgwick | 337/113 |
| 3,706,952 | 12/1972 | Alley | 337/13 X |
| 3,743,977 | 7/1973 | Randall et al. | 337/77 |
| 3,761,855 | 9/1973 | Townsend | 337/78 |
| 3,771,368 | 11/1973 | Albert | 73/503 |
| 3,832,702 | 8/1974 | Szeverenyi | 337/13 X |
| 4,016,766 | 4/1977 | Morris | 73/488 |
| 4,071,338 | 1/1978 | Hutter, III et al. | 96/139 |
| 4,255,629 | 3/1981 | Bell | 337/2 X |
| 4,284,862 | 8/1981 | Overman et al. | 200/61.45 R |
| 4,353,259 | 10/1982 | Schneider, Jr. | 73/653 |
| 4,570,139 | 2/1986 | Kroll | 335/187 |
| 4,574,168 | 3/1986 | Devaney | 200/61.53 |
| 4,737,660 | 4/1988 | Allen et al. | 307/112 |
| 4,891,255 | 1/1990 | Ciarlo | 428/131 |
| 4,895,500 | 1/1990 | Hok et al. | 417/566 |
| 4,959,515 | 9/1990 | Zavracky et al. | 200/181 |
| 5,001,933 | 3/1991 | Brand | 73/651 |
| 5,024,500 | 6/1991 | Stanley et al. | 385/16 |
| 5,049,775 | 9/1991 | Smits | 310/328 |
| 5,072,288 | 12/1991 | Macdonald et al. | 257/420 |
| 5,166,612 | 11/1992 | Murdock | 324/207.13 |
| 5,182,910 | 2/1993 | Benecke | 60/529 |
| 5,712,609 | 1/1998 | Mehregany et al. | 337/70 |

OTHER PUBLICATIONS

H. Matoba et al., "A Bistable Snapping Microactuator", *IEEE*, 45–50 (Jan., 1994).
Werner Reithmüller & Wolfgang Benecke, "Thermally Excited Silicon Microactuators", *IEEE Transactions on Electron Devices*, vol. 35, No. 6, pp. 758–763 (Jun., 1988).
Dino R. Ciarlo, "A Latching Accelerometer Fabricated by the Anisotropic Etching of (110) Oriented Silicon Wafers", *J. Micromech. Microeng.*, 2, 10–13 (1992).

*Primary Examiner*—J. R. Scott
*Attorney, Agent, or Firm*—Fay, Sharpe, Fagan, Minnich & McKee

[57] ABSTRACT

A micromechanical memory sensor. The sensor comprises a latch member mechanically latching upon detection of a threshold value of a variable condition and circuitry for detecting such latching. A sensor further includes a resetting mechanism for electrically unlatching the latch member whereby the sensor latched purely mechanically is electrically reset for repeat use.

4 Claims, 17 Drawing Sheets

MICROMECHANICAL MEMORY SENSOR

This is a continuation of U.S. application Ser. No. 08/258,427, filed Jun. 10, 1994, now U.S. Pat. No. 5,712,609.

BACKGROUND OF THE INVENTION

This invention relates to a micromechanical memory sensor. More particularly, the invention is directed to a micromechanical device which serves as a mechanical memory latch or sensor, the activation of which is triggered by a change of conditions, e.g., temperature, acceleration and/or pressure. Contents of the memory latch can be conveniently detected at any time after latching. The device is electronically resettable so that it can be conveniently reused.

While the invention is particularly directed to the art of micromechanical memory sensors, and will be thus described with specific reference thereto, it will be appreciated that the invention may have usefulness in other fields and applications.

Micromechanical memory sensors are used or have potential use in sensing a variety of different variables or conditions. These variables or conditions include temperature, acceleration, pressure, force . . . etc.

For example, a micromechanical memory sensor adaptable for use in sensing temperature extremes purely mechanically and being electronically resettable would be advantageous for applications wherein field testing is conducted on products and no power supplies are available in the field. However, there are no known micromechanical temperature sensors of this type.

Conventional electronic temperature sensors require a power supply when monitoring temperatures. However, in most instances where the temperature extreme to which a product has been exposed is the desired information, the field monitoring of temperature is not possible with conventional techniques since a power supply may oftentimes be unavailable.

A bistable snapping microactuator having a power supply, or battery, has also been disclosed. H. Matobo, T. Ishikawa, C. Kim, R. Muller, *A Bistable Snapping Microactivator*, I.E.E.E., January 1994, pp. 45–50. The microactuator includes a flexible cantilever which buckles when a temperature extreme, induced by a current, is detected. While this device is ultimately triggered by a temperature change, i.e., resistive dissipation, acceptable operation is only achieved through the use of driving voltages and current pulses applied in a particular timing sequence. This microactuator is not triggered purely mechanically.

As a further example, certain micromechanical memory sensors adapted for use as latch accelerometers are known and provide an inexpensive way of sensing moderate and high-g accelerations by using a micromechanical memory sensor. A latch accelerometer is a switch which latches if accelerated by a predetermined acceleration in a particular direction and remains closed after the acceleration ceases. The primary advantage of latch accelerometers over the conventional acceleration sensing devices is that latch accelerometers do not require complicated sensing electronics. The sensed acceleration can be read out long after the accelerating event. Acceleration latches operate without a power supply and can be made to operate at g levels ranging from only a few g's to several thousand g's and to sense the duration for which the acceleration lasts.

U.S. Pat. No. 4,891,255 to Ciarlo discloses an acceleration latch which uses bulk micromachining of (110) oriented silicon wafers to make two cantilever beams having proof masses, or plates, attached thereto that interlock at a set threshold acceleration. FIGS. 21(a) and 21(b) herein respectively show such a latching accemlerometer similar to that shown in FIGS. 3–4 of the Ciarlo patent. The cantilever beams C are typically several millimeters in length. The fabrication of the cantilever beams C and the proof masses P is fairly complicated since corner compensation and silicon bulk micromachining of (110) wafers are used. (110) bulk micromachining is not readily compatible with IC processing.

The cantilever beams C of the Ciarlo patent must undergo large deflections before latching at their proof masses C. Further, since the horizontal cantilever beam C must force deflection of the vertical cantilever C, which involves the sliding of the two large surfaces, the frictional force between the two proof masses P can be significant and can result in uncertainties in the acceleration sensed. Moreover, the cantilever beams C are not delatchable, thus not resettable.

Another main disadvantage of the latch of the Ciarlo patent is the complicated readout schemes that must be used. Since the cantilever beams C are made by etching through a silicon wafer, the two cantilever beams C cannot be electrically isolated, making a simple continuity test between the two cantilever beams C impossible. The readout schemes of the Ciarlo patent use either capacitive or optical techniques. In either of these schemes the accelerometer wafer must be sandwiched between two other wafers containing capacitive plates or light emitting diodes to sense the position of the cantilevers. This makes the fabrication process much more complicated and expensive. Also, bulk micromachining results in large sized devices.

A direct implementation of the latching mechanism of the Ciarlo patent using surface micromachining is possible and may solve the problem of sensing the latch. However, the device would still suffer from other noted problems related to excessive length of beams C with the proof masses P attached at ends thereto and would still not be resettable.

SUMMARY OF THE INVENTION

An object of the present invention is to provide a micromechanical memory sensor comprising a latch which senses a change in a variable or condition.

An additional object of the present invention is the provision of a micromechanical memory sensor capable of purely mechanically latching in response to sensing a threshold value of a condition or variable.

A still further object of the present invention is the provision of a micromechanical memory sensor comprising a memory latch, the contents of which can be detected at any time after latching.

A still further object of the present invention is the provision of a micromechanical memory sensor that is resettable.

In one aspect of the invention, the micromechanical memory sensor records temperature extremes experienced beyond a preset value, without the use of any electrical power. That is, the sensor is purely mechanically induced. Additionally, the sensor is resettable, small, and inexpensive.

In a further aspect of the invention, the micromechanical memory sensor records acceleration extremes experienced beyond a preset value without the use of any electric power. The sensor is purely mechanically induced. Additionally, the sensor is resettable, small, and inexpensive.

In a still further aspect of the invention, the microchemical memory sensor records pressure extremes experienced beyond a preset valve without the use of electric power. The sensor is purely mechanically induced. Additionally, the sensor is resettable, small, and inexpensive.

Further advantages and scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination, of the various parts of the device, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

The present invention is directed to a micromechanical memory sensor having a variety of potential uses including, in one aspect of the invention, sensing temperature extremes to which the sensor is exposed, in a further aspect of the invention, sensing acceleration extremes to which the sensor is subjected and, in a still further aspect of the invention, sensing pressure extremes to which the sensor is subjected. The sensor comprises a latch which is triggered by the detection of a predetermined threshold, or extreme, in a selected condition, i.e., temperature, acceleration, pressure . . . etc.

Referring now more particularly to the drawings wherein the showings are for purposes of illustrating the preferred embodiments of the invention only and not for purposes of limiting same, FIGS. 1(a)–1(d) illustrate a principal concept of the present invention. Specifically, a sensor latch L includes a sensing mechanism S which senses an external force, or variable, F and mechanically latches under a resetting mechanism R when the force F exceeds a predetermined extreme value for which the latch L is calibrated. While the mechanisms S and R are generally shown as beams longitudinally disposed in the same axis, it is appreciated that other suitable types of mechanisms and arrangements therefor, preferred ones of which will be described hereafter, may be used. Further, the force F imposed on the mechanism S may be the result of a temperature change, accelerator change, pressure change, or the like. Likewise, the actual movement of mechanism S may result from utilization of principles involving the bimetallic effect, mass movement, diaphragm characteristics, or the like.

Notably, the latching is accomplished entirely mechanically. That is, no power supply is needed in order to sense the extremes. This feature is particularly useful where it is desired to gather information respecting extreme conditions to which products, prototypes, or other devices are exposed during field use or testing. Typically, power supplies are not readily available during field use or testing. For example, when tires are tested and it is important to detect a temperature extreme to which the tested tires are exposed, placement of a power supply on the tire to do so during use is impractical. Accordingly, a sensor of the present teaching is useful.

Figure 1A:
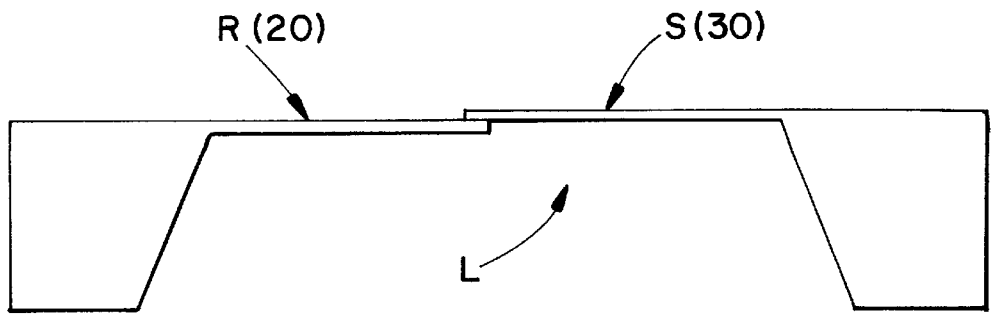
FIGS. 1(a)–1(d) are a diagrammatic representation of the latching process of an exemplary embodiment of the present invention.
Figure 1B:
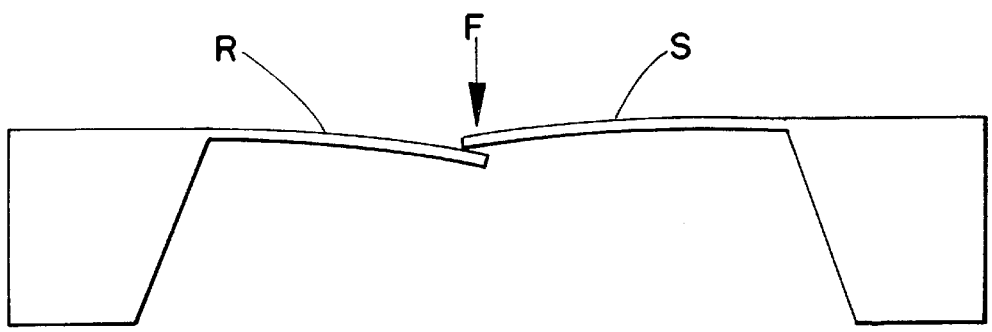
Figure 1C:
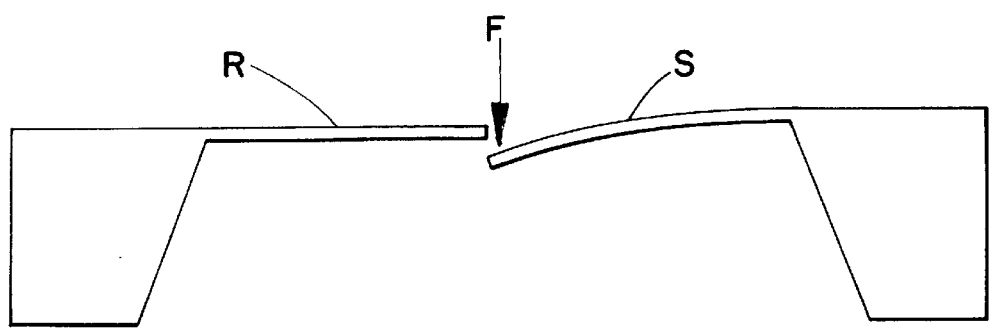
Figure 1D:
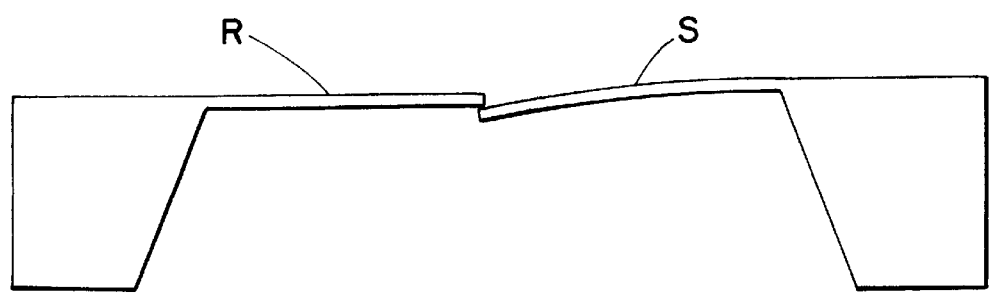

According to the present invention, once an extreme condition has been detected and the sensor has latched, as shown in FIG. 1(d), the sensor remains latched. This feature provides a memory of the extreme condition sensed.

Additionally, the present invention includes readout mechanisms, or test ports, by which it is determined whether the sensor is latched. A convenient reading scheme, i.e., conductivity test or the like, obviates the need for visual inspection and complicated reading electronics. If a plurality of sensors are fabricated on one substrate, simple multiplexing circuitry is used to selectively determine whether sensors are latched. An illustration of the advantages of a simple reading scheme resides in field testing products wherein the sensor can be conveniently read either in the field or in a test laboratory subsequent to testing or use.

As shown in FIGS. 2(a)–2(d), the present micromechanical memory sensor is resettable. The resetting mechanism R is preferably microactuated to induce the sensing mechanism S to unlatch. In the illustrated method, the mechanism R is induced to bend to the extent that the mechanism S tends to slip off mechanism R to return to its original position. Mechanism R may be microactuated thermally (bimetallically), piezoelectrically, or electrostatically.

Resettability allows the sensor to be reused. However, the structure of the sensor according to the present invention is simple and economical. Accordingly, it is recognized that the sensor may also be disposable with or without the resetting feature included.

In FIGS. 1(a)–2(d), a general embodiment and concept of the invention are illustrated. The description hereafter sets forth specific examples of the present invention. First, various embodiments predominantly bulk micromachined will be described (FIGS. 3–10). Next, predominantly surface micromachined embodiments will be treated (FIGS. 11(a)–20).

Figure 3:
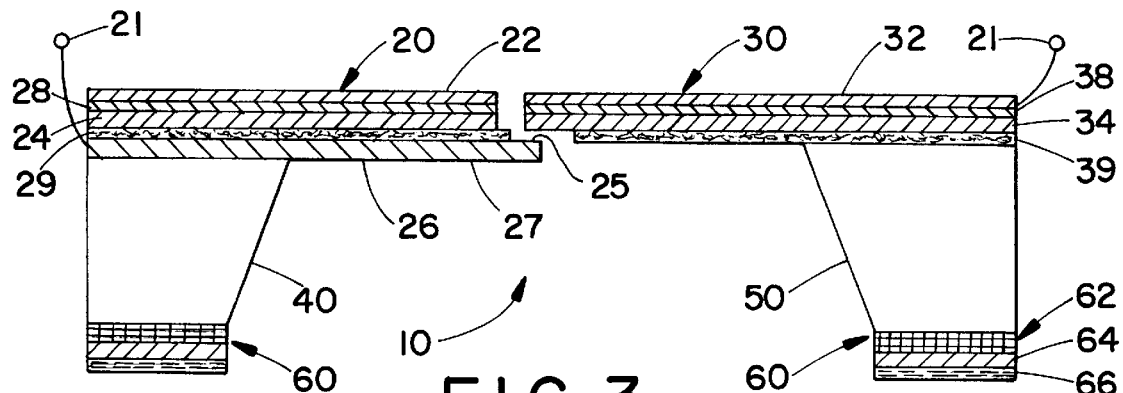
FIG. 3 is a side cross-sectional view of a micromechanical memory sensor of the present invention.

Referring now to FIG. 3, one preferred embodiment for sensing temperature, the micromechanical memory sensor 10 is comprised of a resetting beam 20, test ports 21, a sensing beam 30, and support structures 40 and 50. The beams 20 and 30 are both disposed along the same longitudinal axis. However, beam 30 is more flexible than beam 20. Further, the beams 20 and 30 overlap in that the sensing beam 30 is disposed in opposed relation to a first surface 25 of p + silicon portion 26 of the resetting beam 20.

Resetting beam 20 includes a metal layer 22. The metal layer 22 is preferably gold. However, any metal compatible with the fabrication process is recognized as being suitable. The resetting beam 20 further includes a polysilicon heating resistor 24 and the p + silicon portion 26. The metal layer 22, the heating resistor 24, and the p + silicon portion 26 are respectively divided by two (2) silicon nitride ($Si_3N_4$) layers 28 and 29.

In beam 20, the p + silicon portion 26 extends beyond the terminal end of the metal layer 22, heating resistor 24, and silicon nitride ($Si_3N_4$) layers 28 and 29. The extension of the p + silicon portion 26 has a first surface 25, as noted above, and a second surface 27.

Sensing beam 30 includes a metal layer 32. As with the metal layer 22, metal layer 32 is preferably gold but could be of any suitable substance compatible with the fabrication process. Sensing beam 30 further includes an n-type polysilicon layer 34 and silicon nitride ($Si_3N_4$) dividing layers 38 and 39.

Test ports 21 are connected to portion 26 on beam 20 and layer 32 on the beam 30. These test ports are of any known type which are compatible with conductivity tests, as will be appreciated by those skilled in the art.

The support structures 40 and 50 are formed of silicon substrate and have portions 60 comprising layers of silicon nitride 62, 66 and polysilicon 64. Those skilled in the art will appreciate that, while silicon substrate is preferred for convenience, alternative materials having similar properties may be used without avoiding the scope of the invention.

Moreover, in operation, the sensor 10, of FIG. 3, utilizes the bimetallic effect which results from metal layers 22 and 32 and silicon layers 24 and 34 respectively having different thermal coefficients of expansion. As illustrated in FIG. 3, both of the beams 20 and 30 are bimetallic. Therefore, both beams 20 and 30 bend when a change in temperature occurs.

More specifically, referring generally to FIGS. 1(a)–1(d) wherein mechanism R corresponds to beam 20 and mechanism S corresponds to beam 30, when the ambient temperature increases, both of the beams 20, 30 begin to bend. Since the sensing beam 30 is more flexible than the resetting beam 20, as a result of differing geometric dimensions such as length, thickness and width, it bends a greater amount than the beam 20. In the process, the sensing beam 30 contacts the resetting beam 20. Consequently, an additional bending moment is induced in the resetting beam 20 due to the force supplied by the contacting sensing beam 30 as shown in FIG. 1(b).

As the ambient temperature increases above a preset temperature, the horizontal deflections of the beams 20, 30 surpass their initial overlap. This causes the sensing beam 30 to slip off the resetting beam 20, as shown in FIG. 1(c). Since the sensing beam 30 is more flexible than the resetting beam 20, it will have a larger vertical deflection than beam 20 after the slip occurs, also shown in FIG. 1(c).

Finally, as the ambient temperature returns to room temperature, the beams 20, 30 will move back to their original places without any vertical deflection. However, the sensing beam 30 will become latched underneath the resetting beam 20 in a latched arrangement, as depicted in FIG. 1(d), and engage the resetting beam 20. Therefore, the sensor 10 has recorded the fact that the temperature extreme it was designed to sense has been exceeded. The temperature extreme is actually the point at which the sensing beam 30 slips off the resetting beam 20.

It is recognized that while a change in temperature creates a bending moment in the respective beams 20, 30, resulting in a vertical deflection, the vertical deflection likewise results in a horizontal deflection since the beam length will essentially remain constant during a temperature increase. The effects of thermal expansion on beam length is minimal in comparison to the horizontal deflection caused by the vertical deflection.

A simple conductivity test can be done to determine if the beams 20, 30 are latched. Test ports, or readout mechanisms, 21 shown in FIG. 3, are placed on the sensor at a convenient location. As noted above, if a plurality of sensors are fabricated on a single substrate, then simple multiplexing circuitry is used to selectively detect whether sensors are latched.

Specifically, if the sensing beam 30 is latched underneath the resetting beam 20, the metal layer 32 of sensing beam 30 is in contact with the p + silicon portion 26 of resetting beam 20 resulting in a closed circuit. This contact is ohmic, and, therefore, will result in a potential difference proportional to the amount of current flowing therethrough. The ohmic contact is detected through manipulation of the test ports 21 or related multiplexed circuitry.

However, if the sensing beam 30 is not latched underneath the resetting beam 20, but is just touching it, as would occur for a slight temperature increase from room temperature which is less then the preset value, an open circuit results. Polysilicon layer 34 of beam 30 touches the surface 25 of p + silicon portion 26. The respective test ports 21 are consequently separated by a nonconductive path. As a result, a user easily distinguishes between the two different types of contacts through manipulation of the test portions, or related circuitry, and, consequently, whether latching has occurred.

As will be appreciated by those skilled in the art, if the sensor 10 of FIG. 3 is in the state as shown in FIG. 1(a), a conductivity test will similarly indicate that an open circuit is present. Detection of such an open circuit represents the fact that no temperature extreme was sensed and that the sensor 10 is not latched.

As described above, the sensor 10 latches (FIG. 1(d)) when the ambient temperature exceeds a predetermined value. It is recognized that the ability to reset the sensor 10 is advantageous. However, it is also readily appreciated that the micromechanical memory sensor 10 may be designed to be disposable and, thus, not resettable.

Figure 2A:
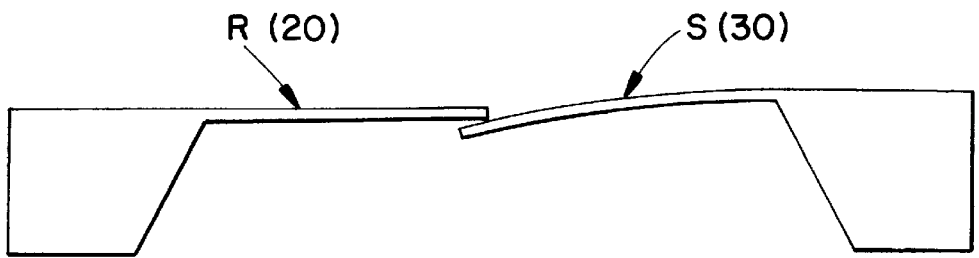
FIGS. 2(a)–2(d) are a diagrammatic representation of the resetting process of the embodiment of FIGS. 1(a)–1(d)
Figure 2B:
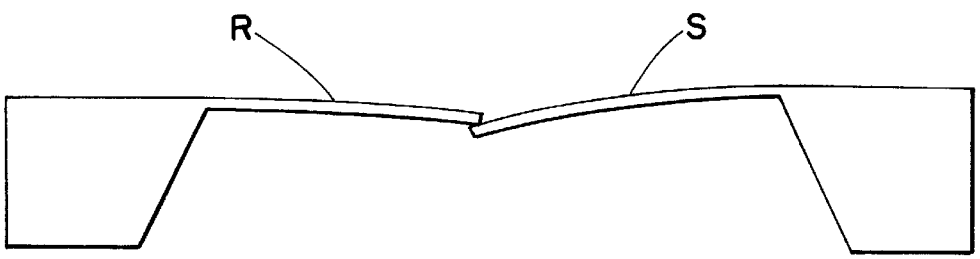

The resetting scheme will now be explained with general reference to FIGS. 2(a)–2(d) wherein mechanism R corresponds to beam 20 and mechanism S corresponds to beam 30. As noted above, a heating resistor 24 is disposed on the resetting beam 20. When an electrical current is induced in and passed through the heating resistor 24, the heat generated is dissipated onto the resetting beam 20. The heat generated by the heating resistor 24 has little affect on the sensing beam 30 since thermal conductivity between the resetting beam 20 and the sensing beam 30 is minimal. In any event, however, thermal conductivity will not cause a malfunction in the resetting scheme as mentioned below. Therefore, the resetting beam 20 will begin to bend vertically and will therefore create a bending moment in the sensing beam 30, as shown in FIG. 2(b).

Figure 2C:
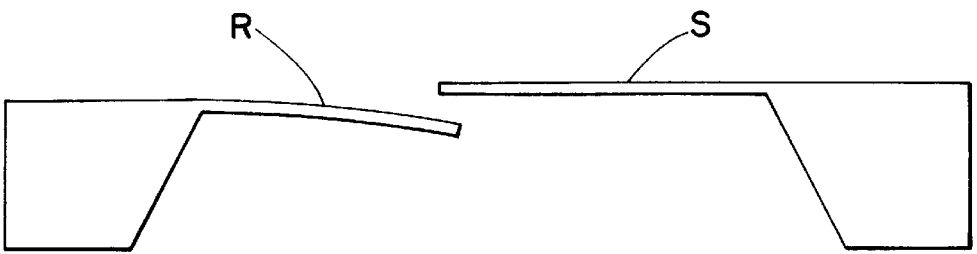
Figure 2D:
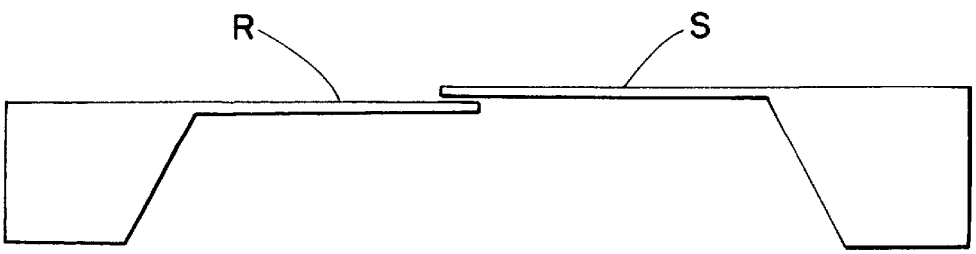

Eventually, the power dissipated by the heating resistor 24 will be large enough such that the horizontal deflection of the two beams 20, 30 will be greater than their initial overlap. This will cause the resetting beam 20 to slip off the sensing beam 30 as shown in FIG. 2(c). The sensing beam 30 will consequently spring to its original position as no heat is dissipated onto it. Once the current in the heating resistor 24 is open circuited as a result of losing contact with the sensing beam 30, the resetting beam 20 will no longer experience a temperature rise. Accordingly, the resetting beam 20 will bend to its original position, as shown in FIG. 2(d), returning the sensor 10 as a whole to its original position.

Resetting has been described utilizing the bimetallic effect. However, an alternative thermal arrangement or an arrangement using piezoelectric material and electrodes could also be used. Moreover, electrostatic resetting may be accomplished using an arrangement adaptable from that described in connection with FIG. 20.

While the memory sensor has been described to sense high extremes, it is recognized that low extremes may be detected as well. More particularly, in an alternative embodiment, the sensor is prelatched so that the sensing beam 30 is latched under the resetting beam 20, is shown in FIG. 2(a). As the value of the temperature decreases, the beam 30 will deflect upwards and will tend to slip off beam 20. Once a low extreme is reached, the beams will become completely unlatched. A simple conductivity test can then be performed to detect whether the sensor is unlatched.

Figure 4A:
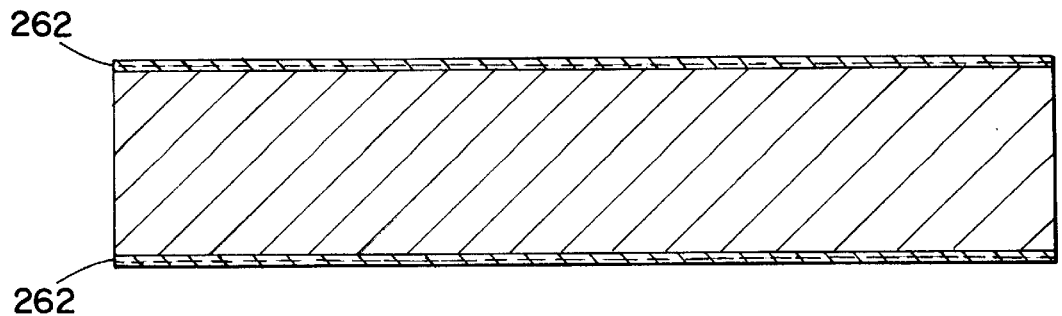
FIGS. 4(a)–4(p) show the fabrication steps for the sensor of FIG. 3.
Figure 4B:
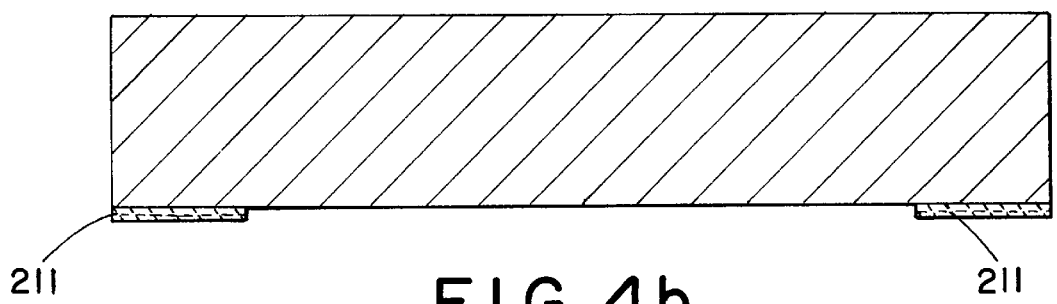
Figure 4C:
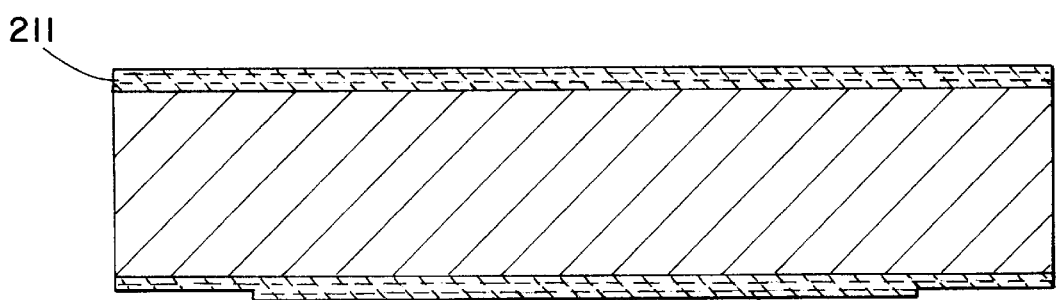
Figure 4D:
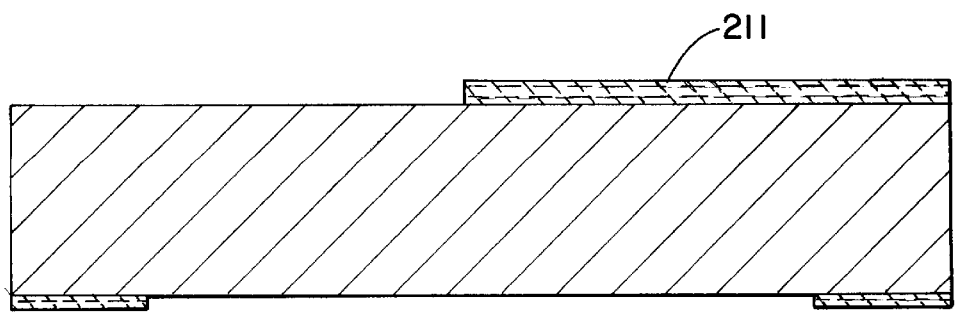
Figure 4E:
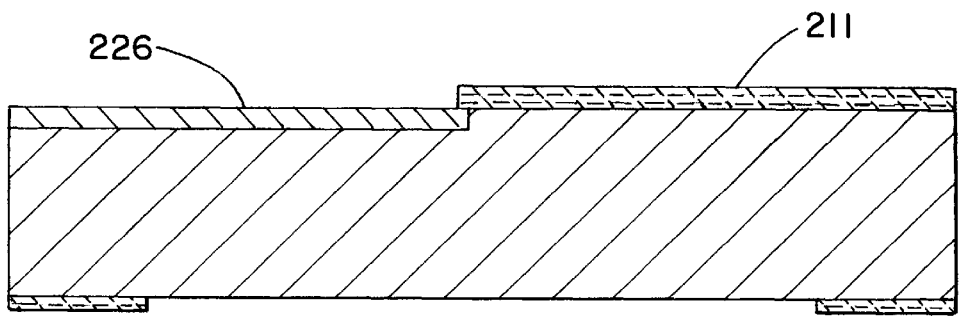
Figure 4F:
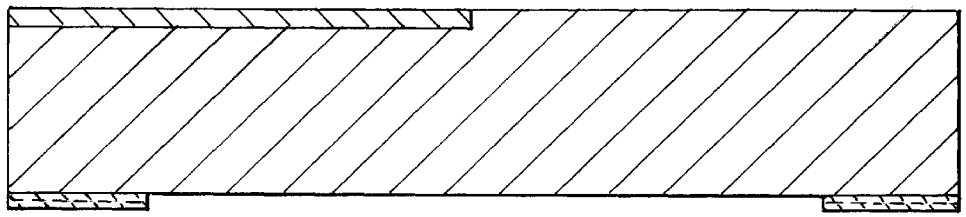
Figure 4G:
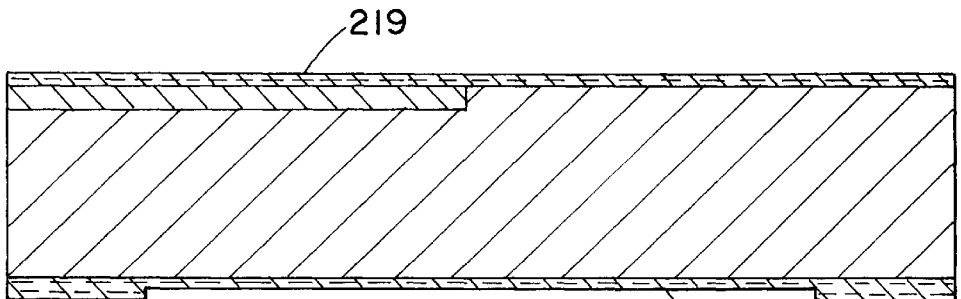
Figure 4H:
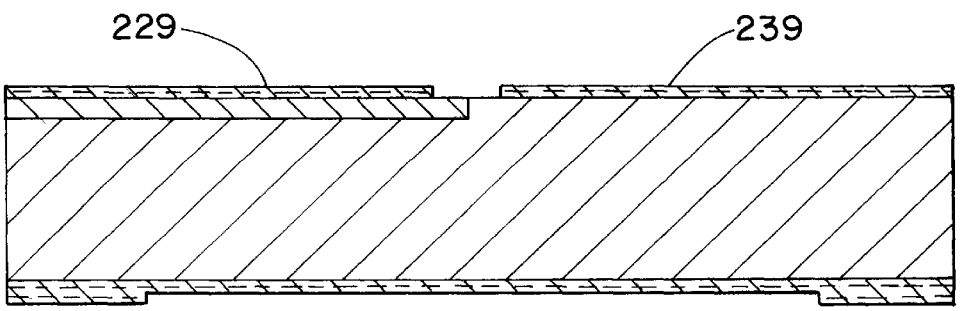
Figure 4I:
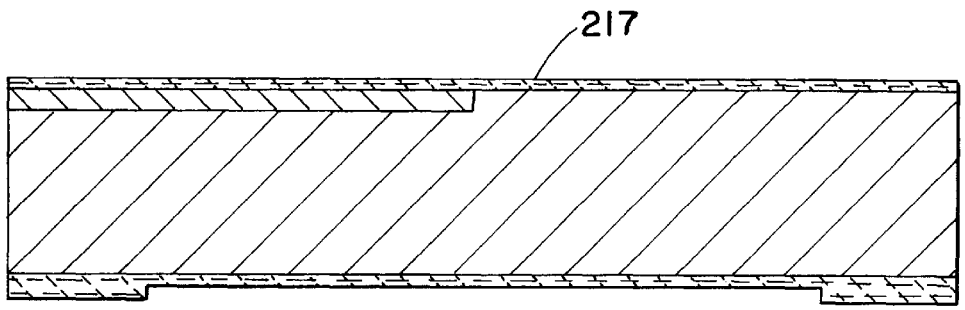
Figure 4J:
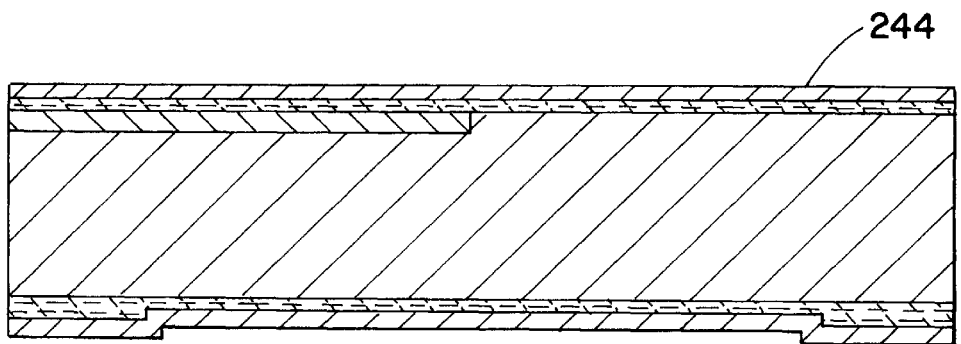
Figure 4K:
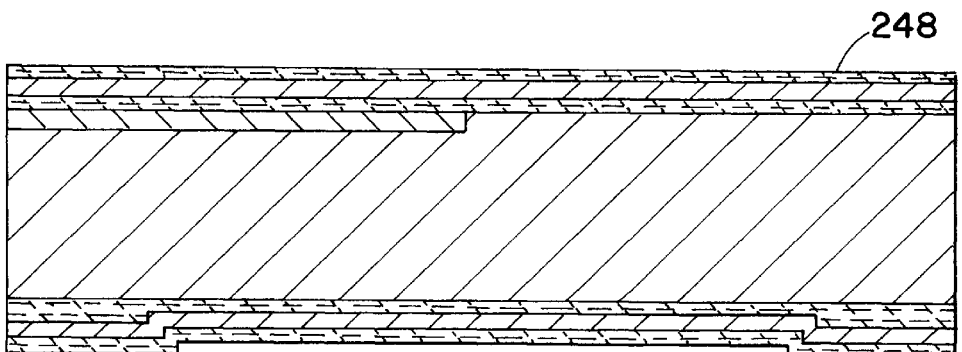
Figure 4L:
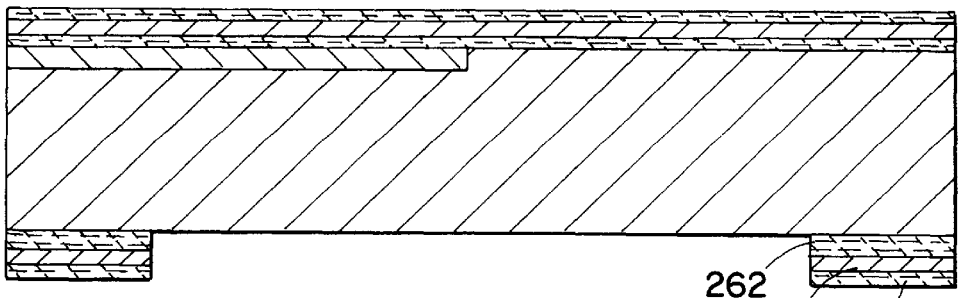
Figure 4M:
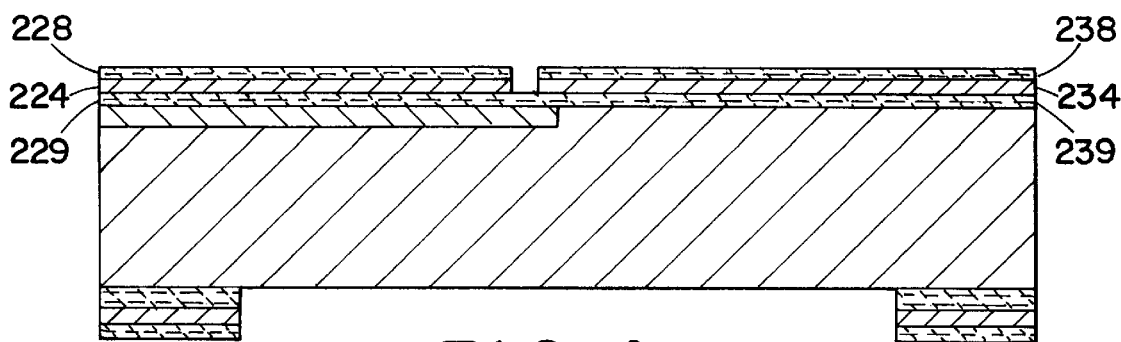
Figure 4N:
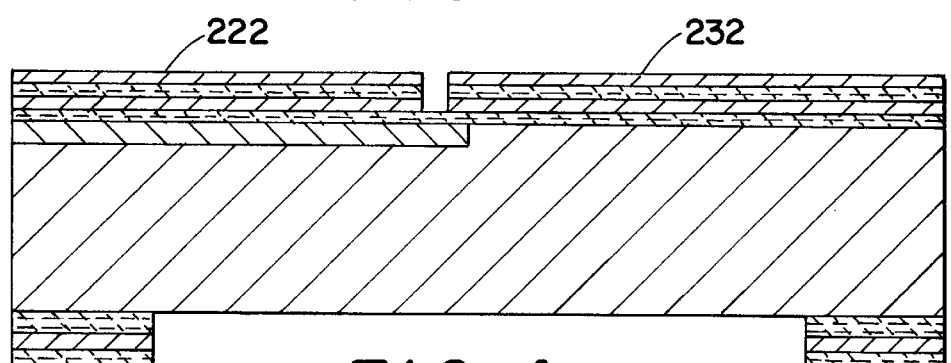
Figure 4O:
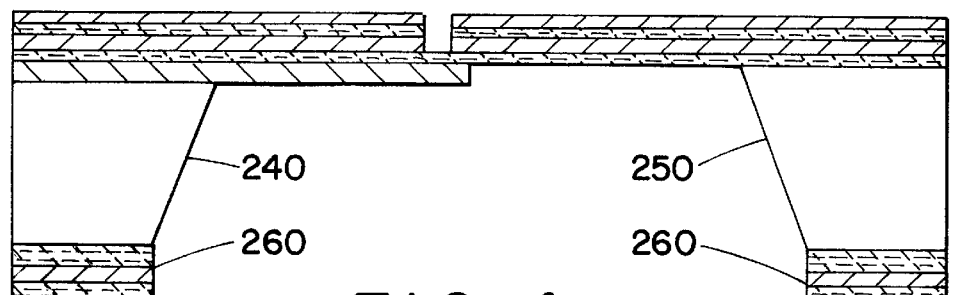
Figure 4P:
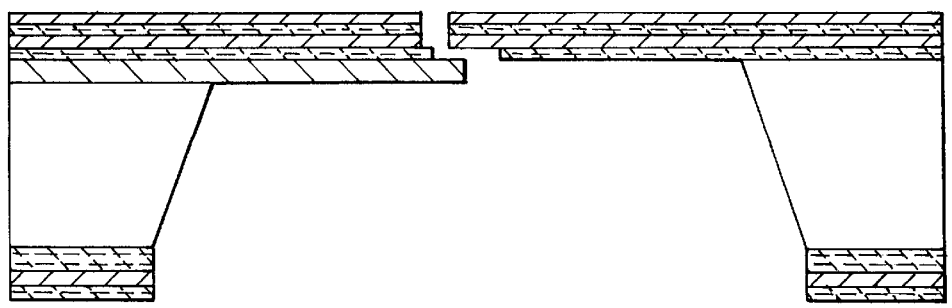

Referring now to FIGS. 4(a)–4(p), wherein reference numerals are increased by two hundred and designate like elements, the fabrication of the device of FIG. 3 begins with a double-side polished (100) oriented silicon wafer having a thin film 262 of silicon nitride on top and bottom surfaces (FIG. 4(a)). The silicon nitride 262 is then patterned using photolithography techniques and reactive ion etching (FIG. 4(b)). A silicon dioxide layer 211 is then grown, patterned, and used as a mask for p + diffusion 226 (FIGS. 4(c)–4(e)). After the p + diffusion, the silicon dioxide is removed (FIG. 4(f)) and silicon nitride 219 is then deposited and patterned into portions 229 and 239 (FIGS. 4(g)–4(h)). A silicon dioxide layer 217 is then grown where the silicon nitride was removed (FIG. 4(i)). Polysilicon 244 is then deposited and doped (FIG. 4(j)). Next a layer of silicon nitride 248 is deposited (FIG. 4(k)). Both the silicon nitride and polysilicon are patterned to form portions 224, 228, 234, and 238 and an oxidation is performed for insulation purposes (FIGS. 4(l)–4(m)). Next the metallic layer (e.g., Cr/Au) is sputtered on and patterned into portions 222 and 232 (FIG. 2(n)). sulk etching from the backside and release of the sacrificial silicon dioxide layer are then performed (FIGS. 4(o)–4(p)). Note that portions 260 comprising layers of silicon nitride and silicon are formed as a result of the process.

Figure 5:
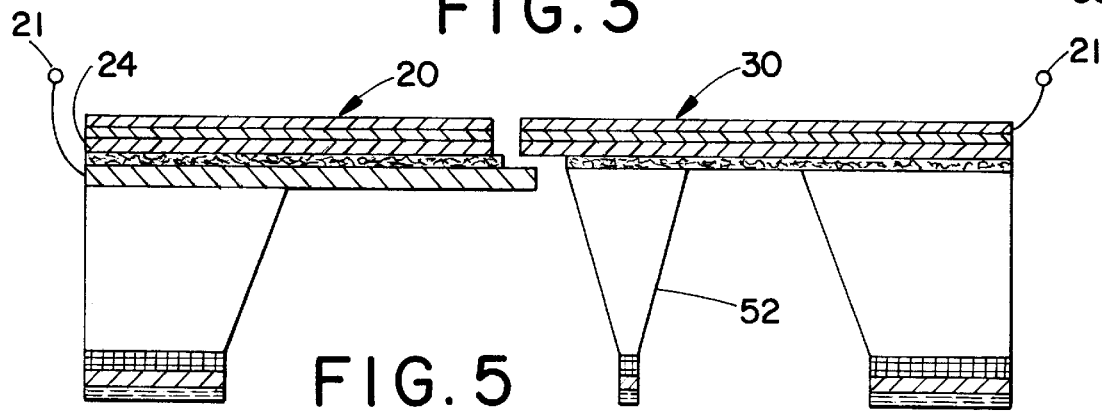
FIG. 5 is a cross-sectional view of an alternative embodiment of the sensor of FIG. 3.

Referring now to FIG. 5, a still further alternative embodiment of the memory sensor for detecting acceleration extremes is shown. The sensor is virtually identical to the sensor 10 of FIG. 3, in both construction and fabrication, except that a proof mass 52 is fabricated on the bottom of sensing beam 30, as will be appreciated by those skilled in the art. Acceleration extremes in the vertical direction are detected, not by manipulation of the bimetallic effect as in the embodiment described in connection with FIG. 3, but by manipulational of mass movement and inertia. When acceleration increases, movement of the proof mass 52 in a predetermined direction causes the beam 30 to bend and, consequently, latch under beam 20 upon detection of an extreme.

Similar to that of the embodiment of FIG. 3, a simple conductivity test is conducted using test ports 21 to determine whether the sensor is latched and heating resistor 24 (or, alternatively, other thermal piezoelectric or electrostatic techniques) is used to reset the device.

Figure 6:
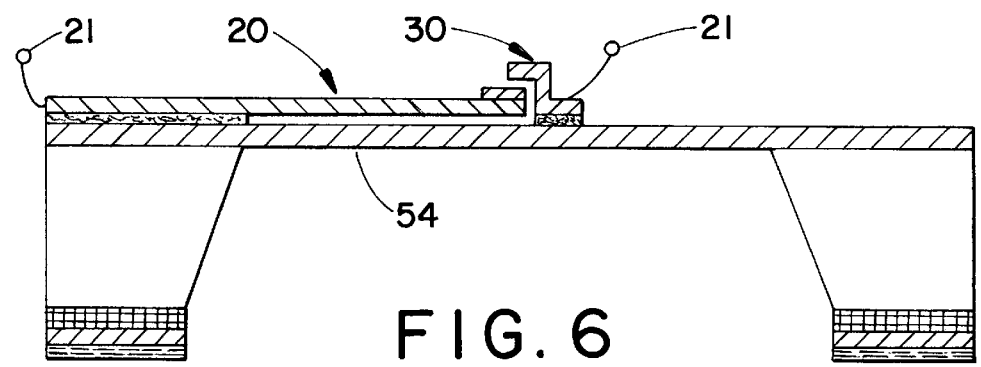
FIG. 6 is a cross-sectional view of an alternative embodiment of the sensor of FIG. 3.

FIG. 6 illustrates micromechanical sensor similar in construction and fabrication to those of FIGS. 3 and 5, except that such sensor detects pressure. Specifically, a sensing beam 30 and a resetting beam 20 are disposed on a diaphragm 54 constructed of p+ silicon similar to portion 26 in FIG. 3. As pressure in the vertical direction causes the diaphragm to buckle, or depress, downwardly, the beam 30 latches beneath the beam 20 upon detection of a predetermined pressure extreme.

As will be appreciated by those skilled in the art, a simple conductivity test may be accomplished using test ports 21 to determine latching and the device may be reset thermally, bimetallically, piezoelectrically, or electrostatically. Further, pressure in an opposite vertical direction may be sensed if the sensor is initially latched.

Figure 7:
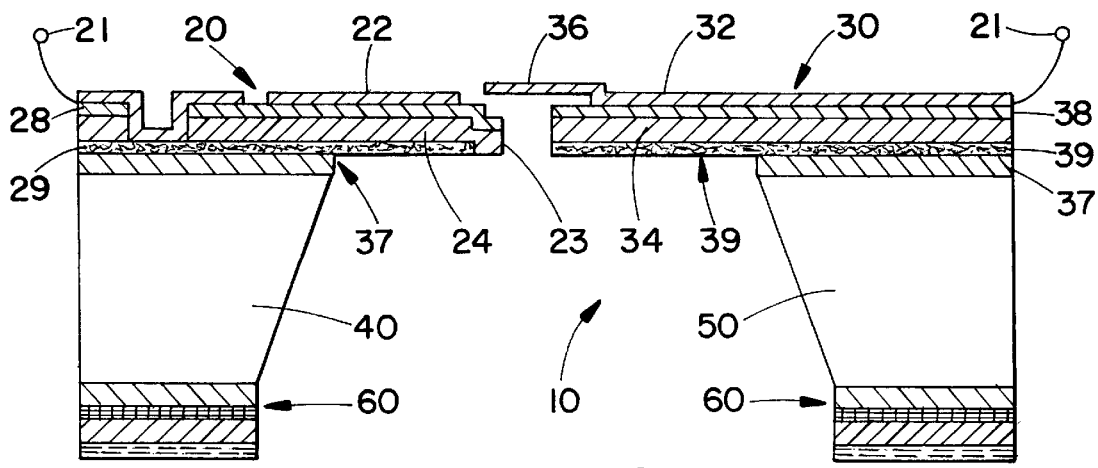
FIG. 7 is a cross-sectional view of an alterative embodiment of the sensor of the present invention.

FIG. 7 illustrates a further embodiment of the present invention. As with all figures, like numbers correspond to like structural elements although specific compositions of like layers may vary. As shown, the sensor 10 of FIG. 7 is similar to that of FIG. 3 except that p + silicon portion 26 is not included and does not extend beyond the remaining layers of beam 20. Instead, overlap is created between beams 20 and 30 in the sensor 10 by the metal extension 36 of the beam 30. Additionally, portions 60 vary in composition compared to the embodiment of FIG. 3, $SiO_2$ layer 37 is disposed between supports 40, 50 and beams 20, 30, respectively, and portion 23 is disposed on the lower terminal surface of beam 20. Portion 23 is useful for readout as will be hereafter described.

It is appreciated that the sensors 10 of FIGS. 3 and 7 have only subtle distinctions in operation from one another due to differences in configurations. For example, the FIG. 3 sensor 10 includes first surface 25, which is contacted by the beam 30 upon an increase in temperature, and a second surface 27 under which the beam 30 is ultimately latched. On the other hand, the FIG. 7 sensor 10 includes an extension 36 which latches under the beam 20 and contacts portion 23 upon detection of a threshold temperature.

To determine latching, test ports 21 are utilized to conduct a simple conductivity test. In this embodiment, test ports 21 are connected to metal layers 22 and 32. If latched, extension 36 contacts portion 23 and a closed circuit results, a conductive path running through layer 24. If not latched, an open circuit results.

The sensor is reset on the device of FIG. 3 as described in connection with FIG. 2, using heating resistor 24 (or, alternatively, other thermal, piezoelectric or electrostatic techniques). Additionally, low temperature extremes are sensed if the sensor is initially latched.

Figure 8A:
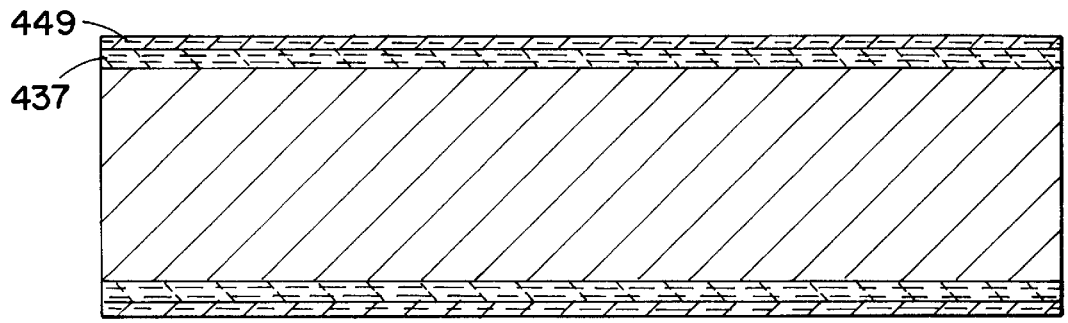
FIGS. 8(a)–8(g) show the fabrication steps of the sensor of FIG. 7.
Figure 8B:
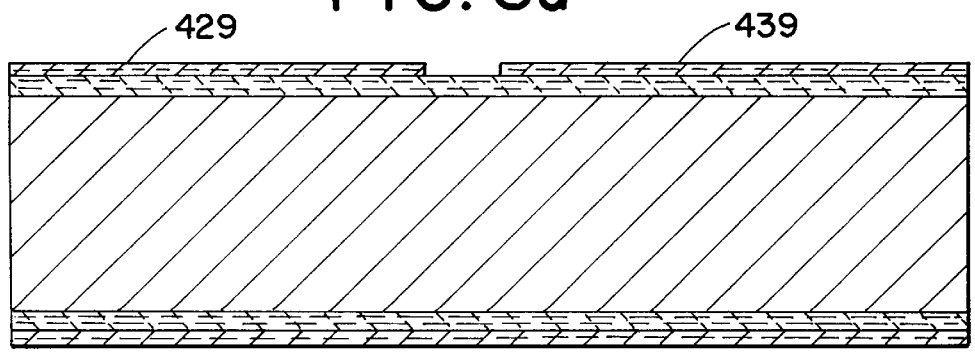
Figure 8C:
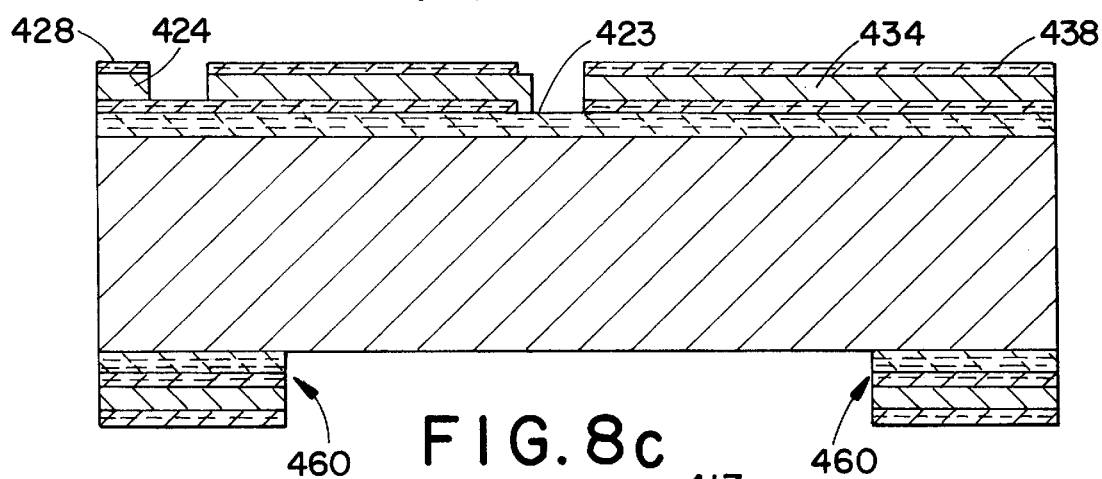
Figure 8D:
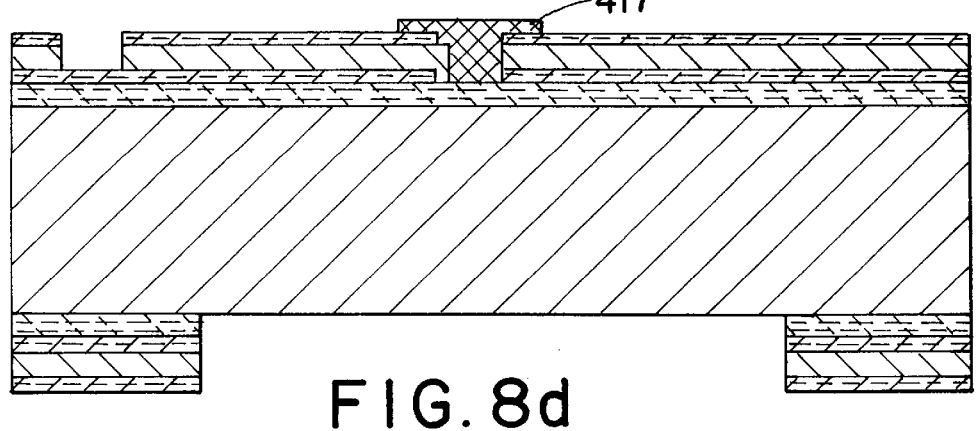
Figure 8E:
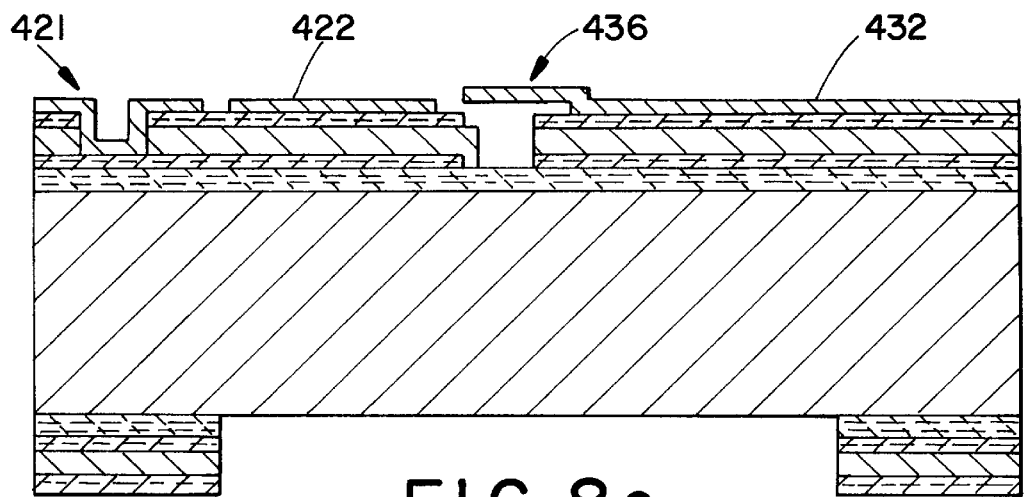
Figure 8F:
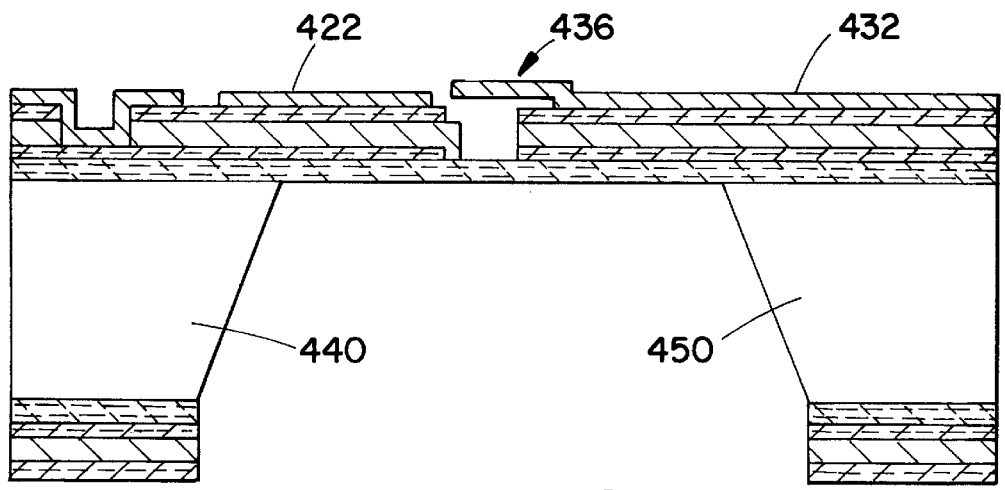
Figure 8G:
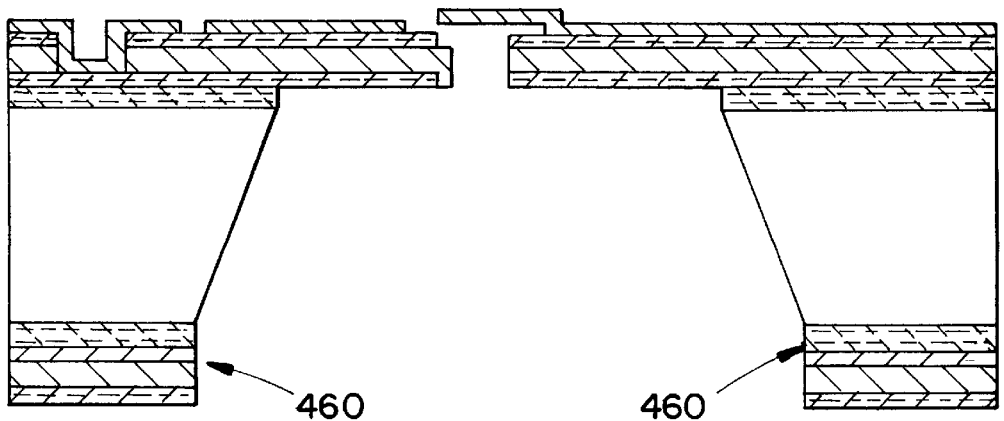

Now referring to FIGS. 8(a)–8(g), wherein the reference numerals have been increased by four hundred and designate like elements, the fabrication of the device in FIG. 7 begins with a double-side polished (100) oriented silicon wafer with thin films of silicon dioxide 437 and silicon nitride 449 (FIG. 8(a)). The first step consists of patterning the silicon nitride on the frontside to form portions 429 and 439 using photolithography and reactive ion etching techniques (FIG. 8(b)). Next polysilicon 424, 423, 434 and silicon nitride 428, 438 are deposited and patterned on the frontside and backside (FIG. 8(c)). A photolithography step is then performed to leave a photoresist sacrificial layer 417 (FIG. 8(d)). The metallic layers 422, 432, and 436 are then sputtered on and patterned (FIG. 8(e)). Note that after the metal is patterned all of the photoresist 417 is removed. Bulk etching and release by removal of the silicon dioxide layer are then performed (FIGS. 8(f)–8(g)). Note that portions 460 are formed in the fabrication process.

Figure 9:
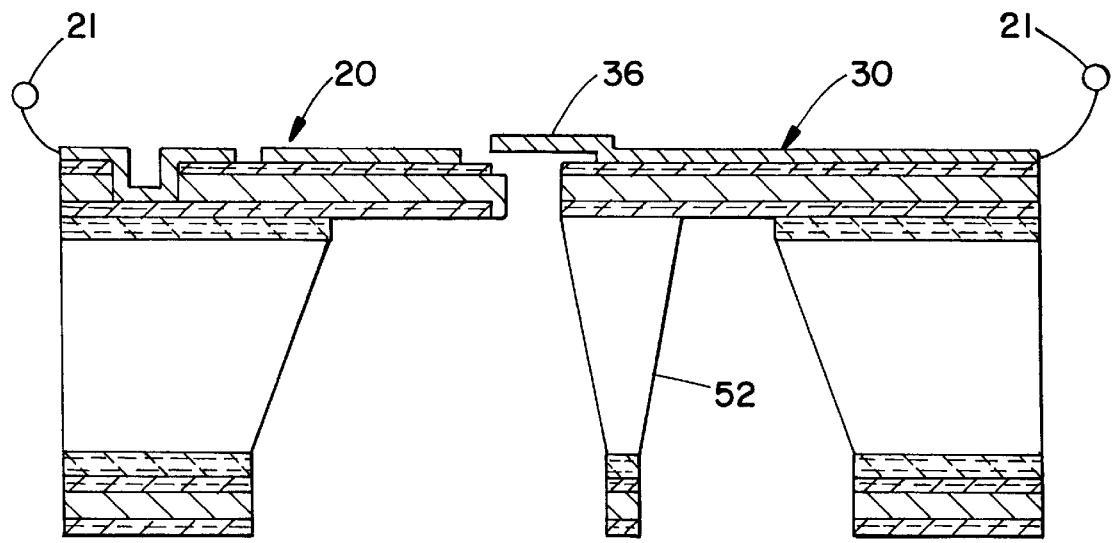
FIG. 9 is a cross-sectional view of an alternative embodiment of the sensor of FIG. 7.
Figure 10:
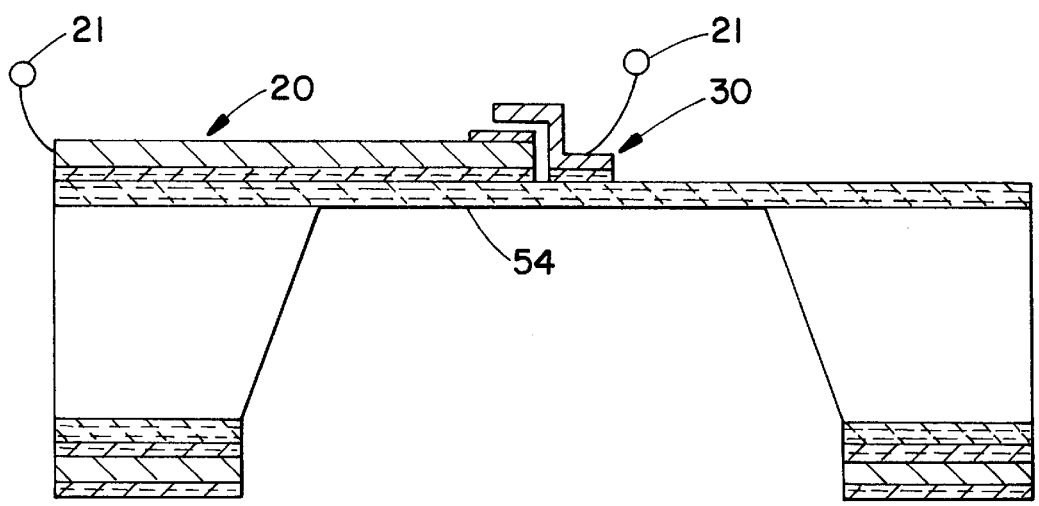
FIG. 10 is a cross-sectional view of an alternative embodiment of the sensor of FIG. 7.

FIGS. 9 and 10 represent alternative embodiments of the sensor 10 of FIG. 7 and illustrate an accelerator latch and pressure latch similar to those of FIGS. 5 and 6, respectively. Their operation is likewise substantially similar to that described in connection with those FIGURES. The fabrication process associated with the embodiments of FIG. 9 and 10 is similar to the process described in connection with FIGS. 8(a)–8(g), as will be appreciated by those skilled in the art. In fact, to obtain the sensor of FIG. 9, the same process is used with the exception of the formation of mass 52.

During the fabrication of the device in FIGS. 3, 5, 6, 7, 9 and 10, residual stresses are induced in the thin films. These stresses relieve themselves after the release step. As a result, the beams will bend up if the residual stress is tensile and down if it is compressive. This residual stress is utilized to tailor the sensitivity of the device. For example, if the beams exhibit an initial deflection in the downward direction, for an equal small temperature (or, accelerator or pressure) increase it would exhibit a greater horizontal tip deflection then if the beams were flat. That is, higher stress on the beam results in increased initial deflection. Therefore, the stress can be used to increase sensitivity.

Figure 11A:
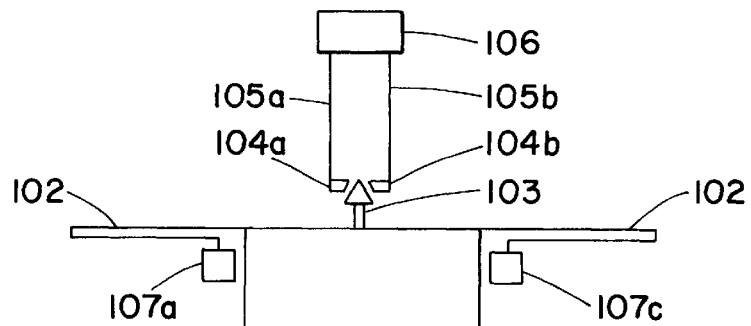
FIGS. 11(a)–11(c) are top views of a further embodiment of the micromechanical memory sensor of the present invention for sensing acceleration.

FIG. 11(a) shows an overall view of another preferred embodiment of the micromechanical memory sensor, i.e., an accelerator latch 100, fabricated using surface micromachining. While the structural configuration of the latch 100 visually differs from that of FIGS. 3, 5, 6, 7, 9, and 10, the basic concepts described in connection with FIGS. 1(a)–2(d) apply equally. That is, the sensor is mechanically latched upon detection of an extreme of some external force, conveniently tested for latching using a simple conductivity test, and electrically reset.

As shown, the acceleration latch 100 comprises a rectangular plate, or proof mass, 101 formed of silicon or nickel supported by four folded beams 102. The folded beams 102 help to relieve the stress in the latch 100.

Figure 11B:
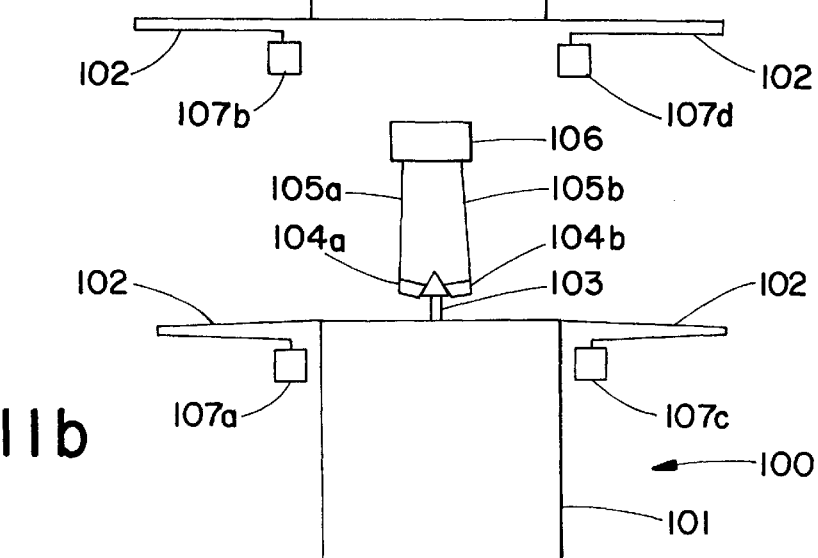

When the plate 101 is subject to an acceleration, the extended portion 103, or male latching member, of the plate 101 pushes against the two fan shaped structures 104a and 104b and hence respectively push the two cantilevers 105a and 105b away from one another as illustrated in FIG. 11(b). The combination of the structures 104a–b and 105a–b act as a female latching member corresponding to the male latching member 103.

Figure 11C:
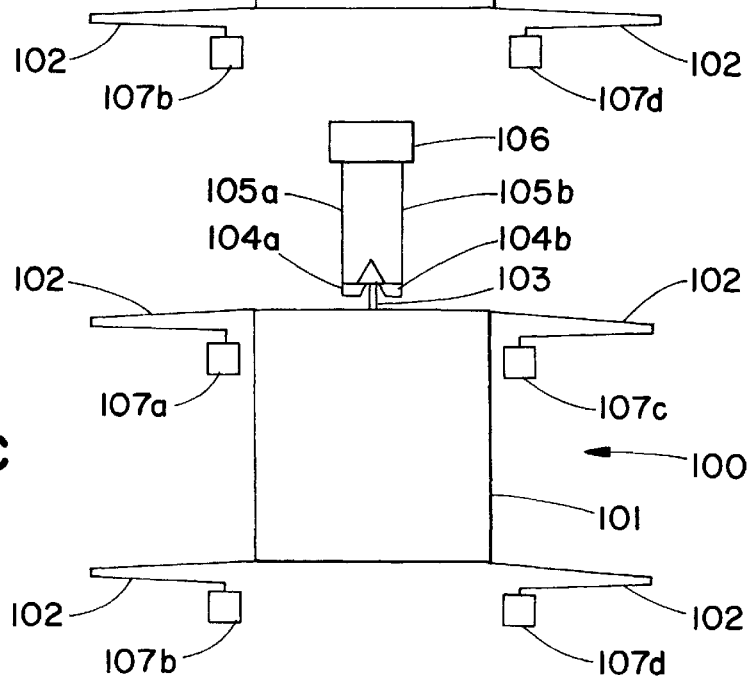
Figure 12A:
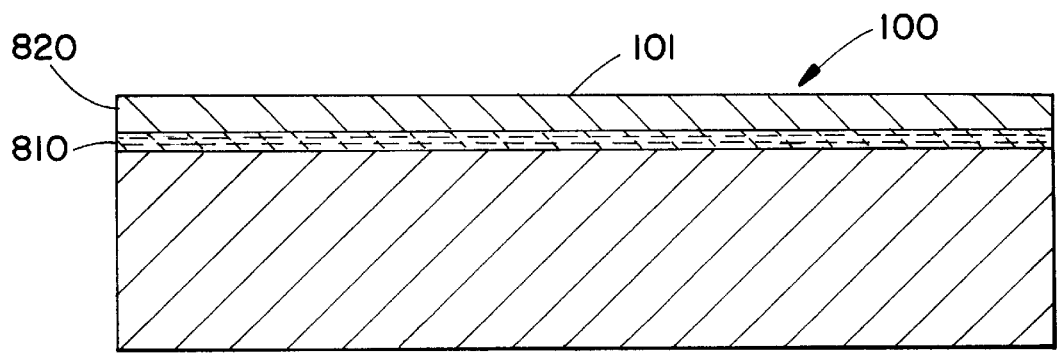
FIGS. 12(a)–12(c) show the fabrication steps of the sensor of FIGS. 11(a)–11(c) using polysilicon surface micromachining.
Figure 12B:
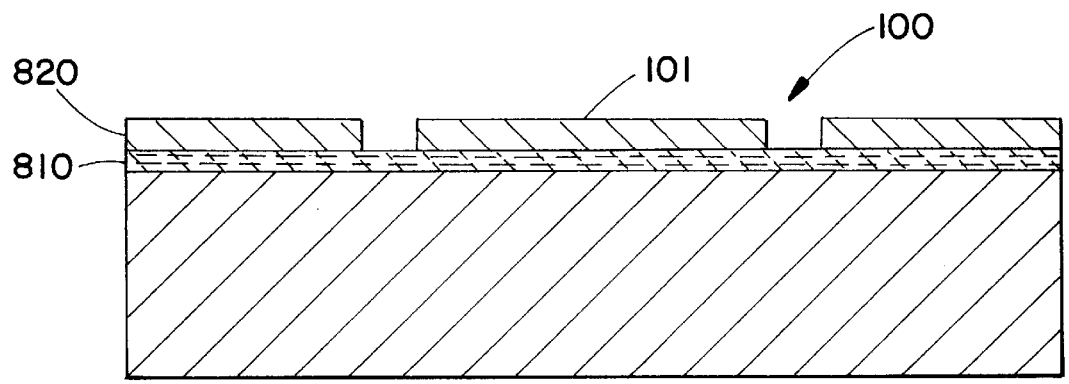
Figure 12C:
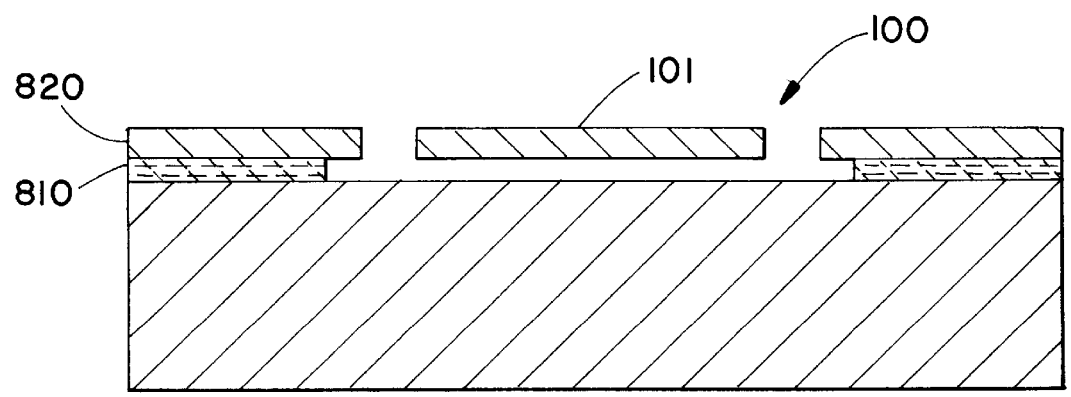
Figure 13A:
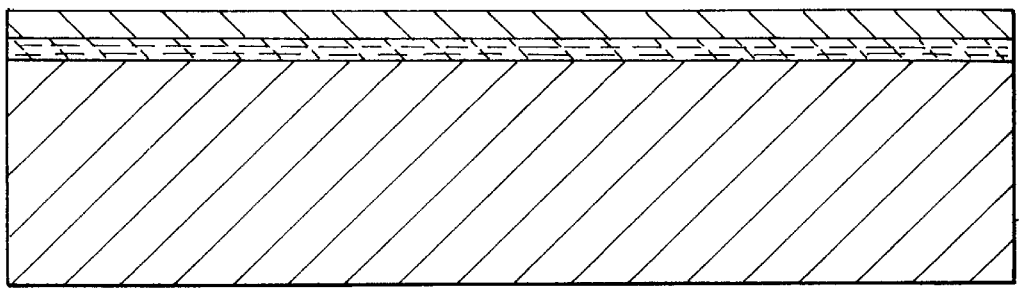
FIGS. 13(a)–13(c) show the fabrication steps of the sensor of FIGS. 11(a)–11(c) using nickel surface micromachining.
Figure 13B:
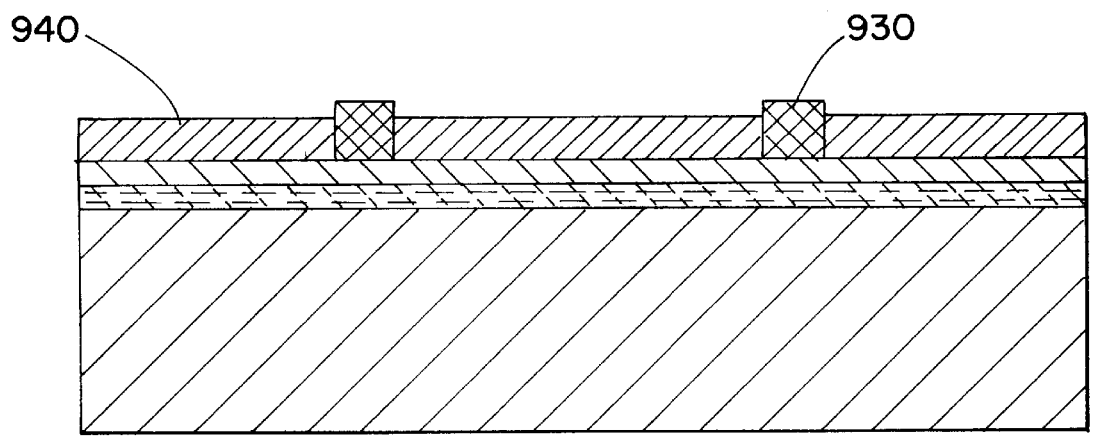
Figure 13C:
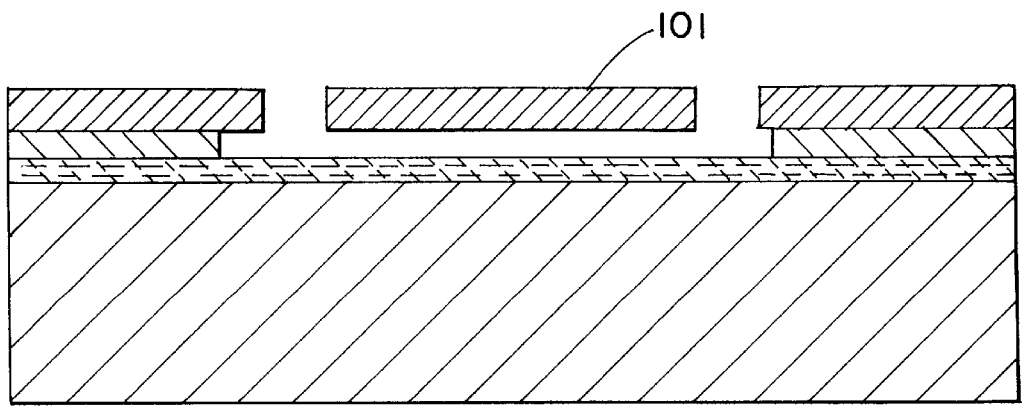

The fan shaped ends 104a and 104b are contoured to provide only a line contact with the extended portion 103 to minimize sliding friction. If the acceleration exceeds a certain threshold value, the extended portion 103 and hence the plate 101 latch on to the fan shaped ends 104a and 104b of the cantilever beams 105a and 105b and stay latched, as shown in FIG. 11(c).

The acceleration latch 100 senses accelerations in the range of several hundred g's to several thousand g's and has folded beams 102 of length 200 to 400 $\mu$m, a plate 101 of 200 to 400 $\mu$m side and cantilevers 105a and 105b of 100 to 200 $\mu$m long. These dimensions result in an acceleration latch 100 of less than one millimeter square in size.

For smaller g's, the lengths of the cantilevers 105a and 105b can be increased and also the mass of the plate 101 can be increased by electroless plating of metals, i.e., nickel on top of the polysilicon plate. To sense larger g's (several thousand) the stiffness of the cantilevers 105a and 105b can be increased.

The duration of contact required for latching between extended portion 103 and fan-shaped structures 104 can be increased to make the device 100 insensitive to shocks of smaller durations. The same can also be achieved by making the extended portion 103 of the plate 101 move a greater distance before it starts pushing the fan shaped structures 104a and 104b near the end of the cantilevers 105a and 105b. Controlling these different features, accelerations ranging from few g's to several thousands of g can be sensed.

The latch can be verified by testing for electrical continuity between the pads 106 and 107a–d which serve as test ports or readout mechanisms. This is possible since the cantilevers 105a–b and the plate 101 are initially electrically isolated. This is a simple procedure as compared to capacitive or optical sensing.

The latch 100 of FIGS. 11(a)–11(c) (and FIGS. 14–20 described hereafter) is constructed of silicon based material. Those skilled in the art will recognize the convenience of using such material in the preferred micromachining techniques.

The device in FIG. 11(a) (and FIGS. 14–20 hereafter described) is constructed using surface micromachining of (100) silicon wafers, a process compatible with IC processing techniques. The mechanical components of the sensor 100 are made by patterning a polysilicon layer of desired thickness (typically 2–5 microns). The polysilicon layer is deposited on a layer of sacrificial oxide of desired thickness which is deposited on the silicon wafer. Only one patterning step is sufficient. Other materials, such as nickel, can also be used in place of polysilicon.

Specifically, with reference to FIGS. 12(a)–12(c) and 13(a)–13(c), the surface micromachined acceleration latches can be fabricated using either polysilicon or nickel surface micromachining processes. As regarding FIGS. 12(a)–12(c), the polysilicon surface micromachining technique begins with a silicon wafer with thin films of silicon dioxide 810 and polysilicon 820 (FIG. 12(*a*)). The polysilicon is then patterned using photolithography and reactive ion etching techniques (FIG. 12(*b*)). The acceleration latch 100 including proof mass 101 is then released in hydrofluoric acid, leaving suspended plates 101 and associated beams (FIG. 12(*c*)).

Now, referring to FIGS. 13(*a*)–13(*c*), the nickel surface micromachining technique begins with a silicon wafer with films of silicon dioxide and polysilicon 940 (FIG. 13(*a*)). Next, a photolithography step, depositing photoresist 930 is performed and nickel is plated (FIG. 13(*b*)). The photoresist is then removed and the sacrificial polysilicon layer is removed in a silicon etchant (e.g., potassium hydroxide), leaving suspended plates 101 and associated beams (FIG. 13(*c*)).

Figure 14:
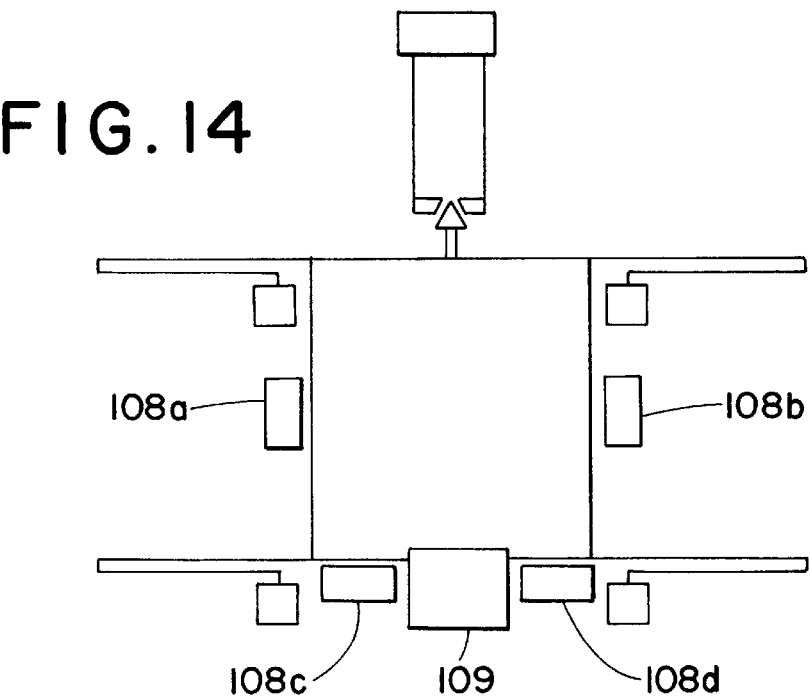
FIG. 14 is a top view of a further embodiment of the micromechanical memory sensor of the present invention for sensing acceleration in one direction.

In a further embodiment, as shown in FIG. 14, the sensor 100 is rendered immune to accelerations in directions other than a selected direction of interest. Stops 108*a*–*d* prevent the motion of the plate in directions other than the sense direction. The silicon substrate and stop 109 prevent the motion of the plate 101 perpendicular to the plane, or surface, of the plate 101. Stop 109 requires 2-polysilicon surface micromachining for fabrication thereof.

Figure 15:
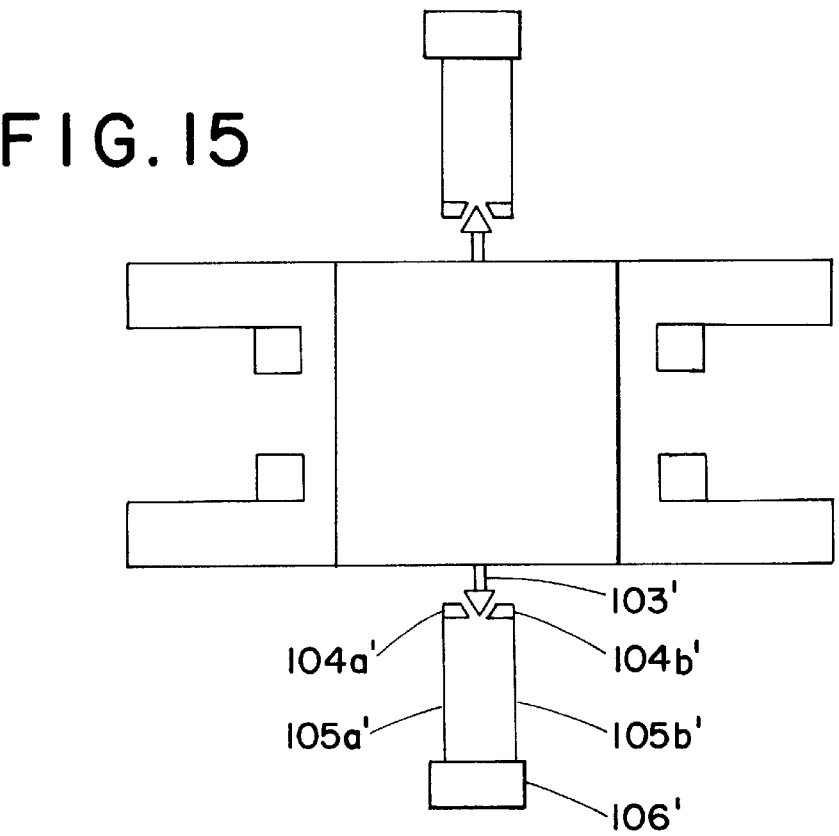
FIG. 15 is a top view of a further embodiment of the micromechanical memory sensor of the present invention for sensing acceleration in two directions.

Moreover, the sensor 100 is modified in a still further embodiment to sense accelerations in two directions, as shown in FIG. 15. The sensor 100 in FIG. 15 is of an identical configuration of the sensor 100 of FIGS. 11(*a*)–11(*c*) but for the inclusion of an additional latching mechanism comprising components 103'–106' to allow bi-directional latching. It is appreciated that the components 103'–106' operate in an identical manner to previously illustrate components 103–106.

Figure 16:
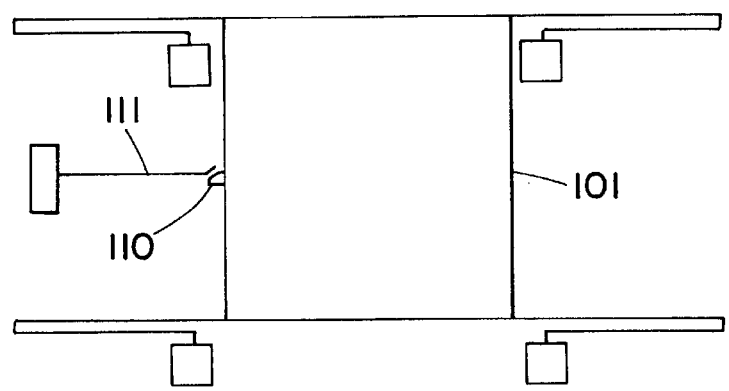
FIG. 16 is a top view of a further embodiment of the micromechanical memory sensor of the present invention for sensing acceleration.

The latching arrangement illustrated in FIG. 16 represents a further embodiment of the invention. As shown, the plate 101 deflects the resilient cantilever 111 until the cantilever 111 passes over protrusion 110 to latch upon the detection of a predetermined acceleration.

Figure 17:
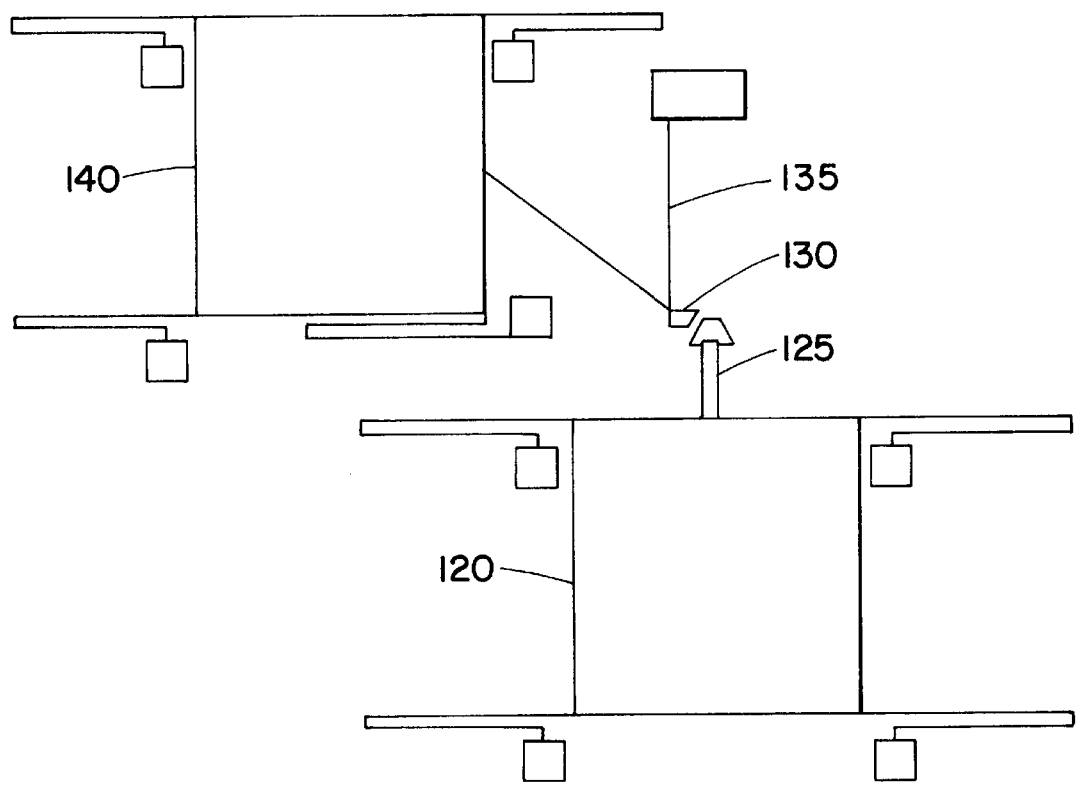
FIG. 17 is a top view of a further embodiment of the micromechanical memory sensor of the present invention for sensing acceleration.

FIG. 17 shows still a further embodiment of a latching accelerometer according to the present invention. As shown, two plates, or proof masses, 120 and 140 are used to avoid any frictional contact between the extended portion, or male latching member, 125 of plate 120 and the fan shaped end 130 of the cantilever 135. Plate 140 is used to pull the fan shaped end 130 away when both plate 120 and 140 are subjected to the preset acceleration. The natural frequencies of the two suspended plates 120 and 140 are chosen such that latching takes place without the extended portion 125 of plate 120 pushing against the fan shaped end 130.

Figure 18A:
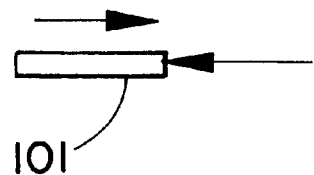
FIGS. 18(a)–18(b) are stylized representations of in-plane latch direction and out-of-plane latch direction, respectively.
Figure 18B:
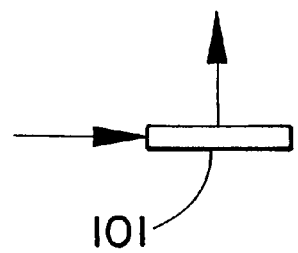
Figure 19:
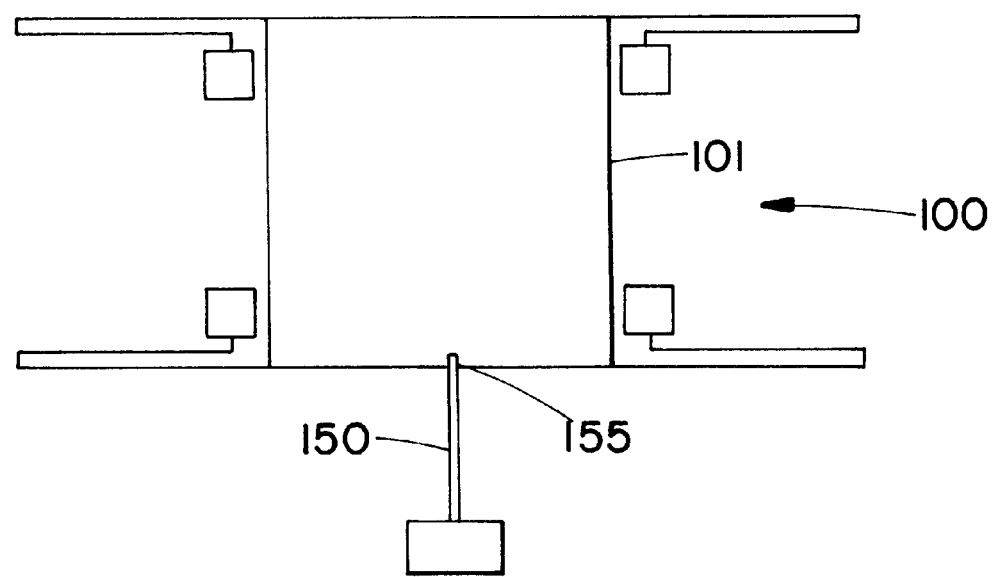
FIG. 19 is a top view of a further embodiment of the micromechanical memory sensor of the present invention for sensing out of plane acceleration.

The acceleration latches described in FIGS. 11(*a*)–17 are in-plane latching devices. That is, the latching takes place in the plane of the silicon wafer and the proof mass 101, as shown in FIG. 18(*a*). Out-of-plane acceleration latches latch in the direction perpendicular to the silicon wafer and the proof mass 101, as shown in FIG. 18(*b*). Several devices, including both in-plane and out-of-plane types, can be included on the same chip to sense acceleration in X, Y, and Z directions. However, (110) bulk micromachined devices, such as the Ciarlo device noted above, can incorporate only in-plane acceleration sensing (in X and Y direction) on the same chip. An out-of-plane latch 100 similar to the in-plane latches is shown in FIG. 19.

More particularly, the latching cantilever 150 overlaps the proof mass 101, which consists of the first polysilicon layer and/or a metallic layer, as shown. When the proof mass 101 is subjected to an acceleration in the out-of plane direction, perpendicular to the surface of the proof mass 101, a force is generated on the latching cantilever 150, which is anchored to the substrate, causing it to deflect in the out-of-plane direction. This vertical cantilever tip 155 deflection will also result in a horizontal/in-plane deflection. Once the in-plane deflection is greater than the overlap, the cantilever beam 150 slips off the proof mass 101 and latches underneath.

Figure 20:
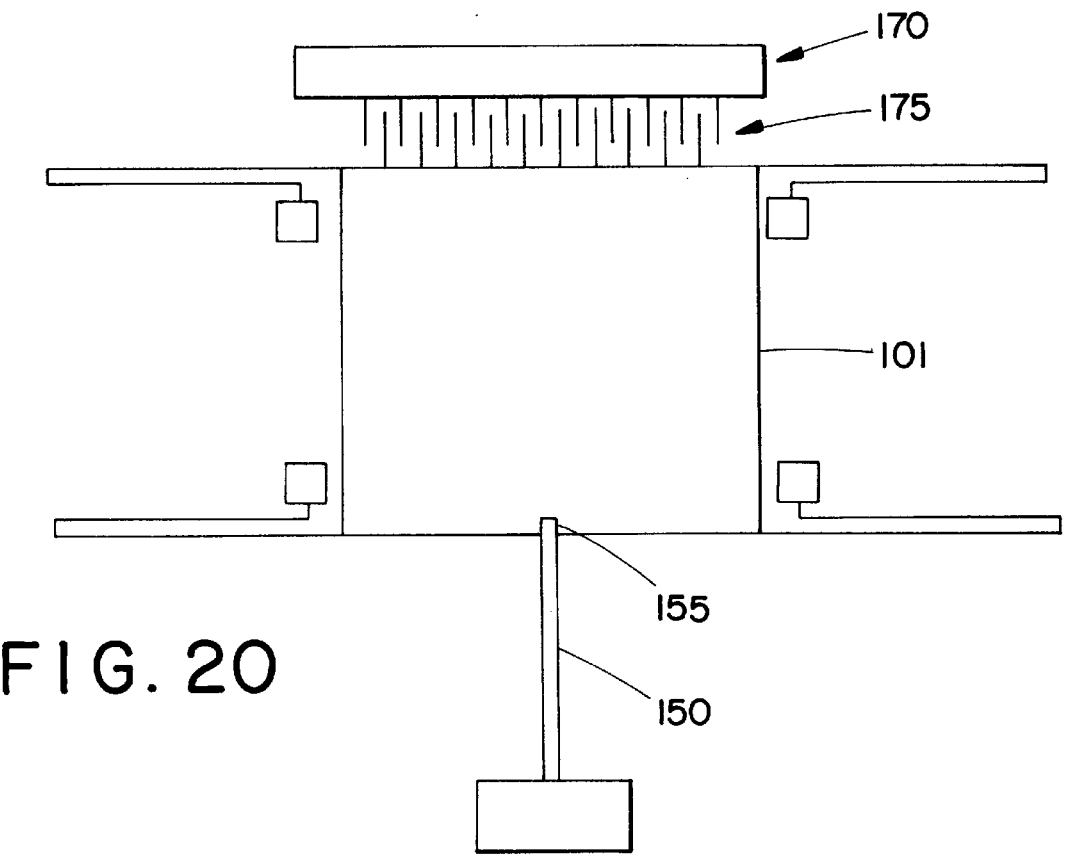
FIG. 20 is a top view of the micromechanical memory sensor of FIG. 19 incorporating a resetting mechanism; and, FIGS. 21(a)–21(b) show an acceleration latch of the prior art in an unlatched state and latched state, respectively.
Figure 21A:
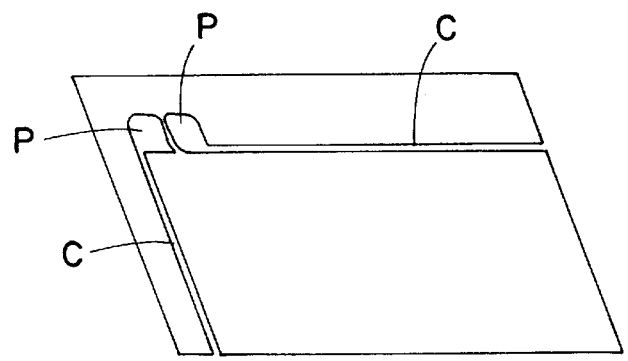
Figure 21B:
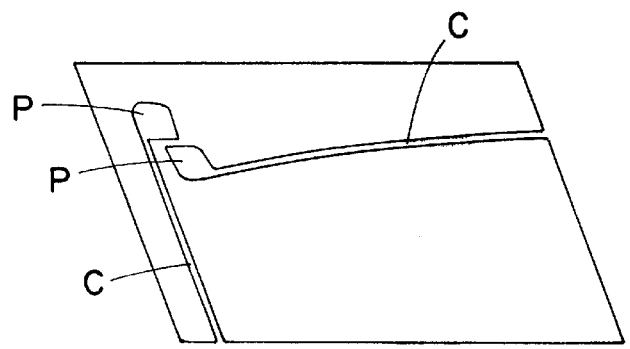

The out-of-plane latch is conveniently fabricated using 2-polysilicon surface micromachining techniques. Moreover, while the existing (110) bulk micromachined latch of FIG. 21 is not resettable, meaning that it cannot be delatched and reused, a resetting mechanism, as will be described with reference to FIG. 20 is further conveniently microfabricated on the surface micromachined acceleration latches of the present invention. It is appreciated that a similar resetting mechanism can be likewise incorporated into the in-plane latching devices. It is further appreciated that alternative resetting schemes incorporating thermal, bimetallic and piezoelectric principles will become readily apparent to those skilled in the art upon a reading hereof.

FIG. 20 shows a top view of an out-of-plane latch acceleration sensor according to the present invention which incorporates a resetting mechanism 170. The resetting mechanism 170 is comprised of an electrostatic comb-drive 175 as shown in FIG. 20. To reset the device 100, the electrostatic comb-drive 175 is implemented. A potential difference is placed on the electrostatic comb-drive 175 to enable the proof mass 101 to be pulled away from the latched cantilever 150. This pulling away is accomplished with relative ease. When the proof mass 101 is pulled away from the cantilever 150 a distance greater than that of the overlap, the latched cantilever 150 can be delatched and thus restored back to its original position so that the sensor can be reused.

Additionally, g-second devices may be fabricated using the surface micromachined accelerometers described herein. A g-second device is different from a conventional accelerometer as it responds to a combination of the acceleration magnitude and the time duration over which the acceleration is sustained. An alternate way of considering this device is as a velocity latch since the device effectively responds to the area under the acceleration/time curve. Viscous damping is used to achieve this feature. By proper selection of the device dimensions through modeling and effective use of viscous damping, it is possible to achieve g-second requirements for time durations of up to several tens of seconds.

Any of the sensors described in accordance with this invention in FIGS. 1–20 are useful as a single micromechanical sensor and, when used in conjunction with a plurality of other sensors, may be used as a sensing system. More particularly, two modes of operation may be accomplished according to the present invention: boolean and quasicontinuous. The boolean operational mode, using one sensor 10, answers the true/false question: Was the preset extreme exceeded? On the other hand, the quasicontinuous operational mode, which utilizes a plurality of sensors, indicates the range of extremes to which the sensing system was exposed, not just whether a single extreme has been exceeded. A system used in the quasicontinuous mode indicates the actual extremes that the system was exposed to by using an array of sensors 10 that accomplish the boolean function individually, as described above. Each device in the array detects a different extreme in specific increments.

For example, four boolean type sensors 10 that sense extremes in increments of 10° C.: 100° C., 110° C., 120° C., and 130° C. can be used. If the maximum temperature extreme that this array was exposed to was 125° C., then the 100° C., 110° C., and 120° C. sensors will indicate that their designed temperature extreme has been exceeded. However, the 130° C. sensor will not indicate the 125° C. temperature extreme. Therefore, the quasicontinuous micromechanical memory sensor system will indicate that an exposed temperature extreme between 120° C. and 130° C. has occurred. Further examples respecting acceleration and pressure will not be specifically described. However, those skilled in the art will appreciate that corresponding quasicontinuous systems for acceleration and pressure are readily apparent upon a reading hereof.

A further significant advantage of the present invention is that not only can a plurality of sensors be fabricated on a single substrate, but a plurality of types of sensors can be fabricated on a single substrate. So, for example, a temperature sensor, acceleration sensor, and pressure sensor may be fabricated on the same substrate to produce a multi-purpose device.

Practical application of the present invention extends beyond sensing technology as described. The invention may also find use as an electrical switch in certain applications.

The above description merely provides a disclosure of particular embodiments of the invention and is not intended for the purpose of limiting the same thereto. As such, the invention is not limited to only the above described embodiments. Rather, it is recognized that one skilled in the art could conceive alternative embodiments that fall within the scope of the invention.

Having thus described the invention, we claim:

1. A micromechanical sensor comprising:
   a mechanical latch being latched upon detection of a threshold value of a variable temperature condition, latching occurring by movement of components of the latch induced by the variable temperature condition;
   a readout mechanism operatively connected to the latch for detecting whether the latch is latched; and
   a resetting mechanism operatively connected to the latch electrically unlatching the latch by inducing movement of the components electrically whereby the sensor latched purely mechanically is electrically reset for repeat use.

2. A micromechanical memory sensor comprising:
   a latch member having a sensing mechanism and a resetting mechanism mechanically latching upon detection of a predetermined temperature extreme;
   a readout mechanism operatively connected to the latch member for detecting whether the latch member is latched, and
   a mechanism operatively connected to the latch member for electrically resetting the latch member.

3. A micromechanical memory sensor comprising:
   a first beam supported at a first end thereof by a first support and having a second end;
   a second beam supported at a first end thereof by a second support and having a second end having flexibility greater than the first beam, the first and second beam being disposed in a first arrangement so that the second end of the second beam engages a first surface of the first beam at the second end of the first beam,
   an increase in ambient temperature facilitating a first deflection in the first beam and a second deflection in the second beam in accordance with the difference in the flexibility of the first and second beams, and,
   a decrease in the ambient temperature facilitating movement of the first and second beams to a second arrangement, the second beam engaging a second surface of the first beam in the second arrangement so that the second beam is latched on the first beam;
   a readout mechanism positioned on the sensor to detect whether the second beam is latched on the first beam; and,
   a means for electrically resetting the first and second beams to the first arrangement.

4. A micromechanical memory sensor comprising:
   a first beam formed of a first material having a first thermal coefficient of expansion and a second material having a second thermal coefficient of expansion, the second coefficient being different than the first coefficient, the first and second materials being disposed in layers having a terminal end and formed on a substrate, the substrate extending beyond the terminal end; and,
   a second beam having flexibility greater than the first beam disposed in a first arrangement such that the second beam opposes a first surface of the substrate, the second beam being formed of the first material and the second material,
   an increase in ambient temperature facilitating a first deflection in the first beam and a second deflection in the second beam in accordance with the difference in the first and second coefficients and the flexibility of the first and second beams, and,
   a decrease in the ambient temperature facilitating movement of the first and second beams to a second arrangement, the second beam engaging a second surface of the substrate in the second arrangement so that the second beam is latched on the first beam; and,
   a means for electrically resetting the first and second beams to the first arrangement.

* * * * *